(12) United States Patent
Shafer et al.

(10) Patent No.: US 11,945,944 B2
(45) Date of Patent: *Apr. 2, 2024

(54) FLEXIBLE ABRASIVE ARTICLE

(71) Applicant: 3M INNOVATIVE PROPERTIES COMPANY, St. Paul, MN (US)

(72) Inventors: Kathleen S. Shafer, Woodbury, MN (US); Rebecca A. Putans, Midland, MI (US); Ernest L. Thurber, Somerset, WI (US); Cyrus A. Anderson, Bellingham, WA (US); Corinne E. Lipscomb, St. Paul, MN (US); Thomas J. Nelson, Woodbury, MN (US); Gregory P. Sorenson, Maplewood, MN (US); Chainika Jangu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/467,147

(22) PCT Filed: Dec. 4, 2017

(86) PCT No.: PCT/US2017/064476
§ 371 (c)(1),
(2) Date: Jun. 6, 2019

(87) PCT Pub. No.: WO2018/106587
PCT Pub. Date: Jun. 14, 2018

(65) Prior Publication Data
US 2020/0071514 A1 Mar. 5, 2020

Related U.S. Application Data

(60) Provisional application No. 62/431,169, filed on Dec. 7, 2016.

(51) Int. Cl.
*C08L 33/14* (2006.01)
*B24D 3/28* (2006.01)
(Continued)

(52) U.S. Cl.
CPC ............... *C08L 33/14* (2013.01); *B24D 3/28* (2013.01); *B24D 11/001* (2013.01); *B24D 11/02* (2013.01);
(Continued)

(58) Field of Classification Search
CPC ........ B24D 3/28; B24D 11/001; B24D 11/02; B24D 11/00; C08F 220/1804;
(Continued)

(56) References Cited

U.S. PATENT DOCUMENTS 4,314,827 A 2/1982 Leitheiser et al.
4,623,364 A 11/1986 Cottringer et al.
(Continued)

FOREIGN PATENT DOCUMENTS

EP 1868770 8/2010
WO WO 2006/083688 8/2006
(Continued)

OTHER PUBLICATIONS

Lee, "Handbook of Epoxy Resins," McGraw-Hill Book Co, 1967, Table of contents, 3 pgs.
(Continued)

*Primary Examiner* — Pegah Parvini
(74) *Attorney, Agent, or Firm* — Aleksander Medved

(57) ABSTRACT

The disclosure relates to a curable composition comprising: a polymerizable epoxy-acrylate resin composition having a complex viscosity at 25° C. and 1 Hz frequency of at least about 4500 Pa-s and a probe tack peak force of at least about 300 kPa; and abrasive particles partially or fully embedded in the polymerizable epoxy-acrylate resin composition. The
(Continued)

disclosure also relates to cured compositions formed from such curable compositions, wherein the abrasive particles are partially or fully embedded in the cured composition. In addition, the disclosure relates to abrasive articles made from such cured compositions as well as methods for making abrasive articles.

22 Claims, 1 Drawing Sheet

(51) Int. Cl.
| | | |
|---|---|---|
| *B24D 11/00* | (2006.01) | |
| *B24D 11/02* | (2006.01) | |
| *C08F 220/18* | (2006.01) | |
| *C08F 220/28* | (2006.01) | |
| *C08F 220/32* | (2006.01) | |
| *C08K 3/013* | (2018.01) | |
| *C08K 3/08* | (2006.01) | |
| *C08K 3/14* | (2006.01) | |
| *C08K 3/26* | (2006.01) | |
| *C08K 3/38* | (2006.01) | |
| *C08K 5/00* | (2006.01) | |
| *C08K 5/132* | (2006.01) | |
| *C08K 5/36* | (2006.01) | |
| *C08L 31/04* | (2006.01) | |
| *C08L 63/04* | (2006.01) | |
| *C08L 71/02* | (2006.01) | |

(52) U.S. Cl.
CPC .......... *C08F 220/18* (2013.01); *C08F 220/28* (2013.01); *C08K 3/013* (2018.01); *C08K 3/14* (2013.01); *C08K 3/26* (2013.01); *C08K 3/38* (2013.01); *C08K 5/0025* (2013.01); *C08K 5/132* (2013.01); *C08K 5/36* (2013.01); *C08L 31/04* (2013.01); *C08L 63/04* (2013.01); *C08L 71/02* (2013.01); *C08F 220/1804* (2020.02); *C08F 220/1807* (2020.02); *C08F 220/281* (2020.02); *C08F 220/285* (2020.02); *C08F 220/325* (2020.02); *C08K 2003/0812* (2013.01); *C08K 2003/265* (2013.01); *C08K 2003/385* (2013.01); *C08L 2312/06* (2013.01)

(58) Field of Classification Search
CPC ............ C08F 220/1807; C08F 220/325; C08F 220/285; C08F 220/28; C08L 63/04; C08L 33/14; C08L 33/12; C08L 31/04; C08L 2312/06
See application file for complete search history.

(56) References Cited

U.S. PATENT DOCUMENTS

| | | | |
|---|---|---|---|
| 4,652,275 A | 3/1987 | Bloecher et al. | |
| 4,744,802 A | 5/1988 | Schwabel | |
| 4,770,671 A | 9/1988 | Monroe et al. | |
| 4,799,939 A | 1/1989 | Bloecher et al. | |
| 4,848,041 A | 7/1989 | Kruschke | |
| 4,881,951 A | 11/1989 | Wood et al. | |
| 5,152,917 A | 10/1992 | Pieper et al. | |
| 5,201,916 A | 4/1993 | Berg et al. | |
| 5,213,591 A | 5/1993 | Celikkaya et al. | |
| 5,256,170 A * | 10/1993 | Harmer .................. | B24D 3/28 51/293 |
| 5,372,620 A | 12/1994 | Rowse et al. | |
| 5,435,816 A | 7/1995 | Spurgeon et al. | |
| 5,454,844 A | 10/1995 | Hibbard et al. | |
| RE35,570 E | 7/1997 | Rowenhorst et al. | |
| 5,672,097 A | 9/1997 | Hoopman | |
| 5,700,302 A | 12/1997 | Stoetzel et al. | |
| 5,922,784 A | 7/1999 | DeVoe et al. | |
| 5,946,991 A | 9/1999 | Hoopman | |
| 5,975,987 A | 11/1999 | Hoopman et al. | |
| 5,984,998 A | 11/1999 | Ottesen et al. | |
| 6,129,540 A | 10/2000 | Hoopman et al. | |
| 6,843,815 B1 | 1/2005 | Thurber et al. | |
| 7,294,048 B2 | 11/2007 | Nelson et al. | |
| 8,034,137 B2 | 10/2011 | Erickson et al. | |
| 8,142,531 B2 | 3/2012 | Adefris et al. | |
| 8,142,532 B2 | 3/2012 | Erickson et al. | |
| 8,142,891 B2 | 3/2012 | Culler et al. | |
| 2002/0182955 A1 | 12/2002 | Weglewski et al. | |
| 2008/0148650 A1* | 6/2008 | You ...................... | B24D 11/02 51/298 |
| 2008/0200106 A1 | 8/2008 | Linnenbrink | |
| 2009/0165394 A1 | 7/2009 | Culler et al. | |
| 2009/0169816 A1 | 7/2009 | Erickson et al. | |
| 2011/0162287 A1* | 7/2011 | Cai ........................ | B24D 11/02 51/298 |
| 2012/0059127 A1 | 3/2012 | Ha et al. | |
| 2012/0227333 A1 | 9/2012 | Adefris et al. | |
| 2013/0040537 A1 | 2/2013 | Schwabel et al. | |
| 2013/0125477 A1 | 5/2013 | Adefris | |
| 2013/0344786 A1 | 12/2013 | Keipert | |
| 2015/0100018 A1 | 4/2015 | Ogawa et al. | |
| 2015/0267097 A1 | 9/2015 | Rosenflanz et al. | |
| 2016/0009963 A1 | 1/2016 | Sugita | |
| 2016/0311084 A1 | 10/2016 | Culler | |

FOREIGN PATENT DOCUMENTS

| | | |
|---|---|---|
| WO | WO 2008/079934 | 7/2008 |
| WO | WO 2016/160357 | 10/2016 |
| WO | WO 2016/195970 | 12/2016 |
| WO | WO 2016/196561 | 12/2016 |
| WO | WO 2017/078978 | 5/2017 |
| WO | WO 2017/095704 | 6/2017 |

OTHER PUBLICATIONS

Matyjaszewski, "Encyclopedia of Polymer Science and Technology," 1986, vol. 6, pp. 322.

International Search report for PCT International Application No. PCT/US2017/064476 dated Mar. 19, 2018, 6 pages.

* cited by examiner

FLEXIBLE ABRASIVE ARTICLE

CROSS REFERENCE TO RELATED APPLICATIONS

This application is a national stage filing under 35 U.S.C. 371 of PCT/US2017/064476, filed Dec. 4, 2017, which claims the benefit of U.S. Provisional Application No. 62/431,169, filed Dec. 7, 2016, the disclosures of which are incorporated by reference in their entireties herein.

BACKGROUND

Flexible abrasives enable the efficient and uniform sanding of contoured areas. Existing flexible coated abrasive products are supported on a paper or polymer backing before they are attached to a backing pad or used for hand-sanding. Furthermore, there are several challenges working with existing products. For example, wet or dry abrasive with a paper backing is flexible when soaked in water, but the cleanup is time-consuming. There is therefore an unmet need for flexible abrasives that meet performance requirements, but do not succumb to the disadvantages of existing products.

SUMMARY

Embodiment 1 relates to a curable composition comprising: a polymerizable epoxy-acrylate resin composition having a complex viscosity at 25° C. and 1 Hz frequency of at least about 4500 Pa-s and a probe tack peak force of at least about 400 g; and abrasive particles partially or fully embedded in the polymerizable epoxy-acrylate resin composition.

Embodiment 2 relates to the curable composition of Embodiment 1, wherein the polymerizable epoxy-acrylate resin composition has an aligned mineral retention after coating of at least about 95%.

Embodiment 3 relates to the curable composition as in any of Embodiments 1-2, wherein the polymerizable epoxy-acrylate resin composition comprises a tetrahydrofurfuryl (THF) (meth)acrylate copolymer component; one or more epoxy resins; and one or more hydroxy-functional polyethers.

Embodiment 4 relates to the curable composition as in any of Embodiments 1-3, wherein the polymerizable epoxy-acrylate resin composition further comprises one or more hydroxyl-containing film-forming polymers.

Embodiment 5 relates to the curable composition as in any of Embodiments 1-4, further comprising one or more photoinitiators.

Embodiment 6 relates to the curable composition as in any of Embodiments 3-5, wherein the THF (meth)acrylate copolymer component comprises one or more THF (meth)acrylate monomers, one or more $C_1$-$C_8$ (meth)acrylate ester monomers, and one or more optional cationically reactive functional (meth)acrylate monomers.

Embodiment 7 relates to the curable composition as in any of Embodiments 3-6, wherein the THF (meth)acrylate copolymer component comprises polymerized monomer units of: (A) 40-60 wt % of tetrahydrofurfuryl (meth)acrylate; (B) 40-60 wt % of $C_1$-$C_8$ alkyl (meth)acrylate ester monomers; and (C) 0-10 wt % of cationically reactive functional monomers, wherein the sum of A)-C) is 100 wt % of the THFA copolymer.

Embodiment 8 relates to the curable composition as in any of Embodiments 3-7, wherein the curable composition comprises: i) from about 15 to about 50 parts by weight of the THF (meth)acrylate copolymer component; ii) from about 25 to about 50 parts by weight of the one or more epoxy resins; iii) from about 5 to about 15 parts by weight of the one or more hydroxy-functional polyethers; iv) in the range of from about 10 to about 25 parts by weight of one or more hydroxyl-containing film-forming polymers; where the sum of i) to iv) is 100 parts by weight; and v) from about 0.1 to about 5 parts by weight of a photoinitiator, relative to the 100 parts of i) to iv).

Embodiment 9 relates to the curable composition as in any of Embodiments 3-8, wherein the one or more hydroxy-functional polyethers is a liquid one or more hydroxy-functional polyethers.

Embodiment 10 relates to the curable composition as in any of Embodiments 5-9, wherein the photoinitiator is a cationic photoinitiator.

Embodiment 11 relates to the curable composition as in any of Embodiments 1-10, wherein the abrasive particles comprise formed abrasive particles.

Embodiment 12 relates to a cured composition formed from the curable composition of any one of Embodiments 1-11, wherein the abrasive particles are partially or fully embedded in the cured composition.

Embodiment 13 relates to an abrasive article comprising the cured composition of Embodiment 12 as an abrasive layer.

Embodiment 14 relates to the abrasive article of Embodiment 13, further comprising at least one of a size coat, a supersize coat, and a backing.

Embodiment 15 relates to the abrasive article of Embodiment 13, further comprising a size coat having a size coat first major surface and a size coat second major surface and the abrasive layer has an abrasive layer first major surface and an abrasive layer second major surface, wherein the abrasive layer first major surface is in direct contact with the size coat second major surface.

Embodiment 16 relates to the abrasive article of Embodiment 15, wherein substantially the entire abrasive layer first major surface is in direct contact with substantially the entire size coat second major surface.

Embodiment 17 relates to the abrasive article of any one of Embodiments 13, 15, and 16, further comprising a backing having a backing first major surface and a backing second major surface, wherein the backing first major surface is in direct contact with the abrasive layer second major surface.

Embodiment 18 relates to the abrasive article of Embodiment 17, wherein substantially the entire backing first major surface is in direct contact with substantially the entire abrasive layer second major surface.

Embodiment 19 relates to the abrasive article of any one of Embodiments 13 and 15-18, further comprising a supersize coat having a supersize coat first major surface and a supersize coat second major surface, wherein the supersize coat second major surface is in direct contact with the size coat first major surface.

Embodiment 20 relates to the abrasive article of Embodiment 19, wherein substantially the entire supersize coat second major surface is in direct contact with substantially the entire size coat first major surface.

Embodiment 21 relates to the abrasive article of any one of Embodiments 13 and 15-20, further comprising a backing having a backing first major surface and a backing second major surface, wherein the backing first major surface is in direct contact with the abrasive layer second major surface.

Embodiment 22 relates to the abrasive article of Embodiment 21, wherein substantially the entire backing first major surface is in direct contact with substantially the entire abrasive layer second major surface.

Embodiment 23 relates to a method of making the abrasive article of Embodiment 13 comprising: coating a curable composition having a curable composition first major surface and a curable composition second major surface between a first liner having a first liner major surface and a first liner second major surface and a second liner having a second liner first major surface and a second liner second major surface, wherein the first liner second major surface is in direct contact with substantially the entire curable composition first major surface and the second liner first major surface is in direct contact with substantially the entire curable composition second major surface; removing the first liner to expose the curable composition first major surface; depositing abrasive particles on the curable composition first major surface, wherein the abrasive particles are partially or fully embedded in the curable composition first major surface; and curing the curable composition to form an abrasive layer having an abrasive layer first major surface comprising the abrasive particles and an abrasive layer second major surface, wherein the abrasive layer second major surface is in direct contact with substantially the entire second liner first major surface.

Embodiment 24 relates to the method of Embodiment 23, further comprising coating the abrasive layer first major surface comprising the abrasive particles with a curable size coat composition and curing the curable size coat composition to give a cured size coat having a cured size coat first major surface and a cured size coat second major surface, wherein the cured size coat second major surface is in direct contact with substantially the entire abrasive layer first major surface.

Embodiment 25 relates to the method of Embodiment 24, further comprising coating the cured size coat first major surface with a curable supersize coat composition and curing the supersize coat composition to give a cured supersize coat having a cured supersize coat first major surface and a cured supersize coat second major surface, wherein the cured supersize coat second major surface is in direct contact with substantially the entire cured size coat first major surface.

Embodiment 26 relates to the method of any one of Embodiments 21-25, wherein at least one of the first liner and the second liner is a releasable liner.

Embodiment 27 relates to the method of any one of Embodiments 21-25, wherein the second liner is a backing.

Embodiment 28 relates to the method of any one of Embodiments 21-25, further comprising removing the second liner.

Embodiment 29 relates to a method of making the abrasive article of Embodiment 13 comprising: coating a curable composition having a curable composition first major surface and a curable composition second major surface on a liner having a liner major surface and a liner second major surface, wherein the liner second major surface is in direct contact with substantially the entire curable composition first major surface; depositing abrasive particles on the curable composition first major surface, wherein the abrasive particles are partially or fully embedded in the curable composition first major surface; and curing the curable composition to form an abrasive layer having an abrasive layer first major surface comprising the abrasive particles and an abrasive layer second major surface, wherein the abrasive layer second major surface is in direct contact with substantially the entire liner first major surface.

Embodiment 30 relates to the method of Embodiment 29, further comprising coating the abrasive layer first major surface comprising the abrasive particles with a curable size coat composition and curing the curable size coat composition to give a cured size coat having a cured size coat first major surface and a cured size coat second major surface, wherein the cured size coat second major surface is in direct contact with substantially the entire abrasive layer first major surface.

Embodiment 31 relates to the method of Embodiment 30, further comprising coating the cured size coat first major surface with a curable supersize coat composition and curing the supersize coat composition to give a cured supersize coat having a cured supersize coat first major surface and a cured supersize coat second major surface, wherein the cured supersize coat second major surface is in direct contact with substantially the entire cured size coat first major surface.

Embodiment 32 relates to the method of any one of Embodiments 29-31, wherein the liner is a releasable liner.

Embodiment 33 relates to the method of any one of Embodiments 29-31, wherein the liner is a backing.

Embodiment 34 relates to the method of any one of Embodiments 29-31, further comprising removing the liner.

These and other aspects of the invention will be apparent from the detailed description below. In no event, however, should the above summaries be construed as limitations on the claimed subject matter, which subject matter is defined solely by the attached claims, as may be amended during prosecution.

DESCRIPTION OF THE FIGURES

The drawings illustrate generally, by way of example, but not by way of limitation, various embodiments discussed in the present document.

Figure 1:
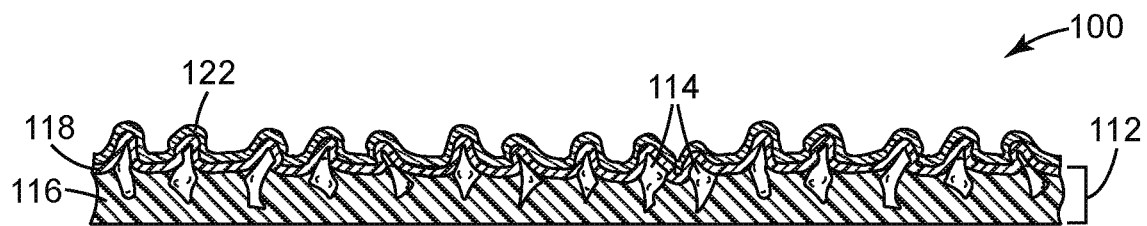
FIGS. 1-4 are side cross-sectional views of abrasive articles according to various examples.

Repeated use of reference characters in the specification and drawings is intended to represent the same or analogous features or elements of the disclosure. It should be understood that numerous other modifications and examples can be devised by those skilled in the art, which fall within the scope and spirit of the principles of the disclosure. Figures may not be drawn to scale.

DESCRIPTION

Abrasive products are used to sand a wide variety of substrates, including soft, difficult to finish materials such as painted surfaces. The applications for coated abrasives for collision repair market are very wide include cleaning, coating removal, filler shaping, metal shaping, paint stripping to metal, primer sanding, paint preparation, paint finishing etc.

Abrasive articles, in general, include a plurality of abrasive particles and a binder. Examples of abrasive articles include bonded abrasive articles (such as grinding wheels), coated abrasive articles, nonwoven abrasive articles, to name a few. Coated abrasive products generally have a backing substrate, abrasive particles, and a binder system which operates to hold the abrasive particles to the backing. For example, in a typical coated abrasive product, the backing is first coated with a layer of binder, commonly referred to as a "make" coat, and then the abrasive particles are applied to the binder coating. As so applied, the abrasive particles optimally are at least partially embedded in the make coat. The resulting binder/abrasive particle layer is then generally solidified or set (such as by a series of drying or curing ovens) sufficient to retain the adhesion of abrasive particles to the backing. After precuring or setting the make coat, a second layer of binder, commonly referred to as a "size coat," is applied over the surface of the make coat and abrasive particles, and, upon setting, it further supports the particles and enhances the anchorage of the particles to the backing. Optionally, a "supersize" coat, which may contain grinding aids, can be applied over the precured size coat. In any event, once the size coat and supersize coat, if used, has been cured, the resulting coated abrasive product can be converted into a variety of convenient forms such as sheets, rolls, belts, and discs for, among other applications, for metal working belt applications, such as for gate removal.

Some abrasives currently in production and use employ epoxy-acrylate hybrid chemistry to prepare the make coat to manufacture coated abrasives. But there are some challenges to existing coated abrasives. For example, current make resin coating on paper and film backings is very brittle. In addition, due to the low viscosity of the resin, it fills the fibers of porous cloth backings making the construction brittle, and less pliable, which has some limitations for coated abrasives. Further, existing make-coats exhibit poor adhesion with untreated backings. Thus, processing of backings is required to increase the adhesion with the make resin, which adds to the cost and complexity in manufacturing.

Described herein are abrasive articles comprising polymerizable (e.g., photopolymerizable) epoxy-acrylate resin compositions as toughened make compositions for next generation coated abrasives. As demonstrated herein, these new make resin compositions form a self-supporting abrasive layer that can serve as both make and backing layers for an abrasive article. This means that expensive backings currently used in coated abrasives can be avoided, and opens up opportunities for new cost-advantaged constructs, particularly in the area of flexible abrasive articles.

FIG. 1 shows one example of an abrasive article referred to by the numeral 100. As shown, the abrasive article 100 includes a plurality of layers. From the bottom to the top, with the abrasive surface facing upwards, these layers include: an abrasive layer 112, and a supersize coat 122. Here, the abrasive layer 112 is itself multilayered and includes an abrasive layer 116, abrasive particles 114, and a size coat 118. It should be clear from the abrasive article illustrated in FIG. 1, in contrast to the abrasive articles depicted in FIGS. 2-4, that the abrasive article lacks a backing. But a backing can be added to the abrasive article depicted in FIG. 1 to arrive, for example, at an abrasive article such as the one depicted in FIGS. 2-4. In another example, the abrasive article 100 can comprise an attachment layer (not shown) that is one part of a hook-and-loop attachment mechanism.

Figure 2:
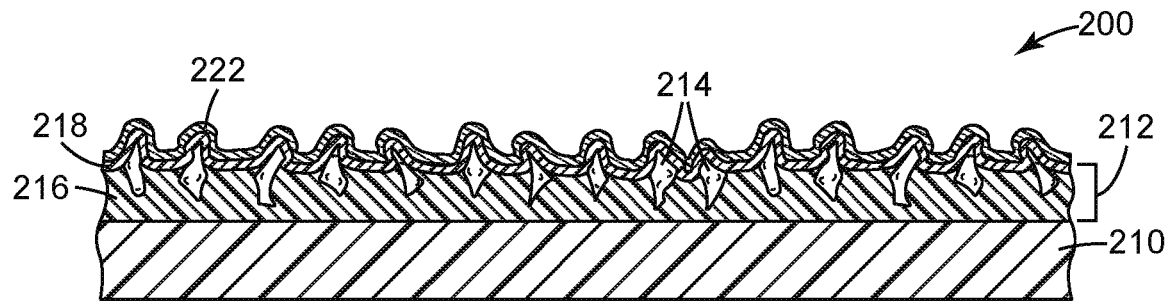

FIG. 2 shows one example of an abrasive article referred to by the numeral 200. As shown, the abrasive article 200 includes a plurality of layers. From the bottom to the top, with the abrasive surface facing upwards, these layers include: an optional backing 210, an abrasive layer 212, and a supersize coat 222. Here, the abrasive layer 212 is itself multilayered and includes an abrasive layer 216 abrasive particles 214, and a size coat 218. In another example, the abrasive article 200 can comprise an attachment layer (not shown) that is one part of a hook-and-loop attachment mechanism.

Figure 3:
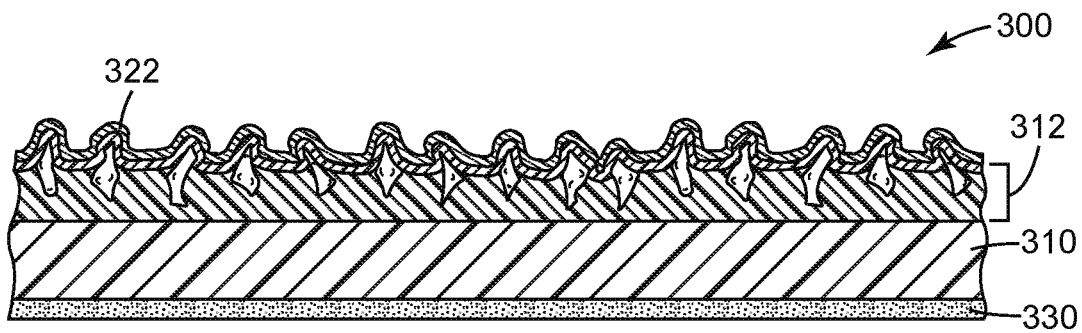

FIG. 3, like FIG. 2, shows an abrasive article 300 having an optional backing 310, abrasive layer 312, and supersize coat 322. The abrasive article 300 additionally has a continuous attachment layer 330 that extends across and directly contacts a major surface of the backing 310 facing away from the abrasive layer 312. In one example, the attachment layer 330 is a removable pressure-sensitive adhesive. In another example, the attachment layer 330 is one part of a hook-and-loop attachment mechanism. In some embodiments, the backing 310 is absent. In this example, the attachment layer 330 extends across and directly contacts a major surface of the abrasive layer 312, where the major surface of the abrasive layer is the one facing away from the supersize coat 322.

Figure 4:
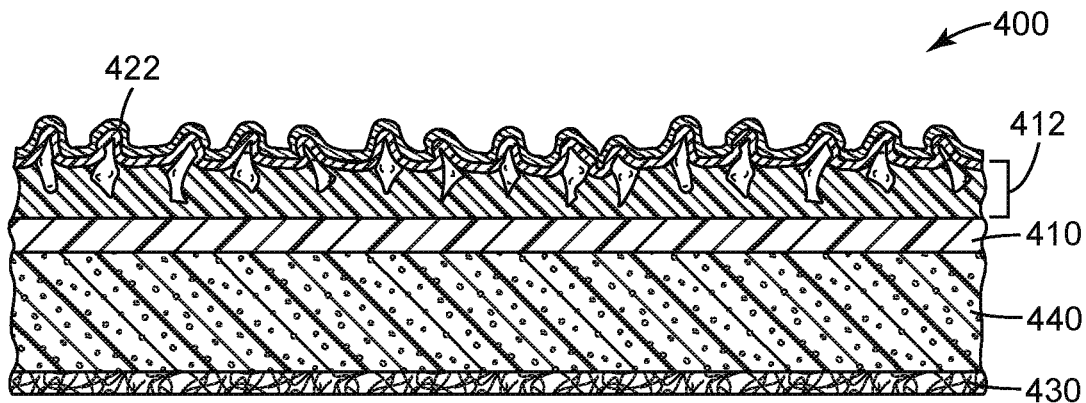

FIG. 4, like FIGS. 2 and 3, shows an abrasive article 400 having an optional backing 410, abrasive layer 412, and supersize coat 422. Like the abrasive article 300 in FIG. 3, the abrasive article 400 has an attachment layer 430. In this example, the attachment layer 430 is one part of a hook-and-loop attachment mechanism. A polymeric compressible foam 430 can be interposed between the backing 410 and the attachment layer 430. Optionally but not shown, one or more additional layers could be disposed between any of the above layers to help adhere layers to each other, provide a printed image, act as a barrier layer, or serve any other purpose known in the art. By providing compressibility to the abrasive article 400, the compressible foam 440 can enable a more uniform contact with the workpiece to the abraded, and particularly so where the workpiece has non-planar contours. As a further option, the backing 410 and compressible foam 440 could be consolidated into a single layer that serves both functions.

The layer configurations described above are not intended to be exhaustive, and it is to be understood that layers can be added or removed with respect to any of the examples depicted in FIGS. 1-4.

The abrasive layer of the abrasive article of the various embodiments described herein is made from a curable composition. In some instances, therefore, this specification makes reference to cured or uncured compositions, where the cured composition is synonymous with the abrasive layer. In some examples, the curable composition comprises a polymerizable epoxy-acrylate resin composition having a complex viscosity at 25° C. and 1 Hz frequency of at least about 4500 Pa-s; and abrasive particles partially or fully embedded in the polymerizable epoxy-acrylate resin composition. In some specific examples, the cured composition/abrasive layer is the photopolymerization product of the curable composition. In some examples, the cured polymerizable epoxy-acrylate resin composition has a storage modulus (G') at 25° C. and 1 Hz frequency of at least about 300 MPa.

In some examples, the polymerizable epoxy-acrylate resin composition has a complex viscosity at 25° C. and 1 Hz frequency of at least about 600 Pa-s, at least about 1200 Pa-s, at least about 4000 Pa-s, at least about 4500 Pa-s, at least about 8000 Pa-s, at least about 10,000 Pa-s or at least 12,000 Pa-s. In some examples, the polymerizable epoxy-acrylate resin composition has a complex viscosity at 25° C. and 1 Hz frequency of up to about 8000 Pa-s, up to about 10,000 Pa-s, up to about 12,000 Pa-s or up to about 15,000 Pa-s. In still other examples, the polymerizable epoxy-acrylate resin composition has a complex viscosity 25° C. and 1 Hz frequency of about 600 Pa-s to about 3000 Pa-s, about 3000 Pa-s to about 8000 Pa-s, 6000 Pa-s to about 15,000 Pa-s, about 8000 Pa-s to about 10,000 Pa-s, about 8000 Pa-s to about 12,000 Pa-s or about 10,000 Pa-s to about 15,000 Pa-s.

In some examples, the polymerizable epoxy-acrylate resin composition has a storage modulus (G') at 25° C. and 1 Hz frequency of at least about 5,000 Pa, at least about 20,000 Pa, at least about 30,000 Pa or at least 40,000 Pa. In some examples, the polymerizable epoxy-acrylate resin composition has a G' at 25° C. and 1 Hz frequency of up to about 20,000 Pa, up to about 30,000 Pa, up to about 40,000 Pa or up to about 50,000 Pa. In still other examples, the polymerizable epoxy-acrylate resin composition has a G' at 25° C. and 1 Hz frequency of about 5000 Pa to about 10,000 Pa, 10,000 Pa to about 50,000 Pa, about 20,000 Pa to about 40,000 Pa, about 25,000 Pa to about 40,000 Pa or about 25,000 Pa to about 35,000 Pa.

In some examples, the polymerizable epoxy-acrylate resin composition has a loss modulus (G") at 25° C. and 1 Hz frequency of at least about 5,000 Pa, at least about 20,000 Pa, at least about 30,000 Pa or at least 40,000 Pa. In some examples, the curable composition has a G" at 25° C. and 1 Hz frequency of up to about 20,000 Pa, up to about 30,000 Pa, up to about 40,000 Pa or up to about 50,000 Pa. In still other examples, the curable composition has a G" at 25° C. and 1 Hz frequency of about 5000 Pa to about 10,000 Pa, 10,000 Pa to about 50,000 Pa, about 20,000 Pa to about 40,000 Pa, about 25,000 Pa to about 40,000 Pa or about 25,000 Pa to about 35,000 Pa.

In some examples, a 10 cm×5 cm×0.07 mm film (the film can be of any suitable dimension, however) formed from curing the polymerizable epoxy-acrylate resin composition has a G' at 25° C. and 1 Hz frequency of at least about 300 MPa, at least about 400 MPa, at least about 600 MPa or at least about 800 MPa. In some examples, the cured polymerizable epoxy-acrylate resin composition has a G' of up to about 400 MPa, up to about 500 MPa, or up to about 950 MPa. In some examples, a 10 cm×5 cm×0.07 mm film (the film can be of any suitable dimension, however) formed from the cured polymerizable epoxy-acrylate resin composition has a G' of about 300 MPa to about 950 MPa; about 400 MPa to about 800 MPa; or about 300 MPa to about 600 MPa.

In some examples, a 10 cm×5 cm×0.07 mm film (the film can be of any suitable dimension, however) formed from curing the polymerizable epoxy-acrylate resin composition has a G" at 25° C. and 1 Hz frequency of at least about 100 MPa, at least about 200 MPa, at least about 250 MPa or at least about 350 MPa. In some examples, the cured polymerizable epoxy-acrylate resin composition has a G" of up to about 200 MPa, up to about 300 MPa, or up to about 400 MPa. In some examples, a 10 cm×5 cm×0.07 mm film (the film can be of any suitable dimension, however) formed from the cured polymerizable epoxy-acrylate resin composition has a G" of about 100 MPa to about 300 MPa; about 100 MPa to about 200 MPa; or about 150 MPa to about 250 MPa.

The complex viscosity, G', and G" measurements can be obtained using a TA Instruments Discovery HR-2 rheometer with disposable 8 mm diameter aluminum parallel plate geometry directly probed viscoelastic properties of the copolymers and generated time-temperature-superposition (TTS) curves. Measurements can be performed at a constant nominal strain value within the linear viscoelastic regime, determined with strain sweeps (0.004 to 2.0% oscillatory strain) at 1 Hz. The samples were subjected to temperature-step, frequency-sweep experiments at 10° C./step. The time-temperature superposition method can be utilized to investigate the frequency dependence over a wide frequency range. The resulting G' and G" for each polymer can be shifted using the TA Instruments TRIOS software package and horizontal shift factors (aT). Master curves based on shifting and overlapping both G' and G" generated horizontal shift factors, which can be fitted to the WLF equation using TRIOS. The G' and G" and complex viscosity values can then be extracted at 25° C. at 1 Hz frequency.

In some examples, a film (e.g., a 25.4 mm×125 mm×0.17 mm film, but the film can be of any suitable dimension, however) made from the curable compositions of the various embodiments described herein have a probe tack peak force as determined using the methods described herein of at least about 100 g, at least about 200 kPa, at least about 300 kPa, at least about 400 kPa or at least about 500 kPa. In some examples, the curable compositions of the various embodiments described herein have a probe tack peak force of at most about 1000 kPa, at most about 900 kPa, at most about 800 kPa; at most about 700 kPa or at most about 600 kPa. In some examples, the curable compositions of the various embodiments described herein have a probe tack peak force of from about 200 kPa to about 1000 kPa (e.g., about 200 to about 800 kPa, about 300 to about 500 kPa or about 400 to about 600 kPa).

In some examples, a film (e.g., a 25.4 mm×125 mm×0.17 mm film, but the film can be of any suitable dimension, however) made from the curable compositions of the various embodiments described herein have an aligned mineral retention, after coating, as determined using the methods described herein of at least about 80%, at least about 85%, at least about 90%, at least about 95% or at least about 99%. In some examples, the curable compositions of the various embodiments described herein have an aligned mineral retention of at most about 100%, at most about 99%, at most about 98%; at most about 95% or at most about 90%. In some examples, the curable compositions of the various embodiments described herein have an aligned mineral retention of from about 80% to about 100% (e.g., about 85% to about 95%, about 90% to about 99% or about 95% to about 99%).

In some examples, the curable composition of the various embodiments described herein can be placed in direct contact with, e.g., a 9.5 by 12 cm section of production tool filled with shaped abrasive particles (e.g., those prepared according to the disclosure of U.S. Pat. No. 8,142,531, which is incorporate by reference as if fully set forth herein, by molding alumina sol gel in equilateral triangle-shaped polypropylene mold cavities), to which no substantial amount of curable composition remains adhered to the tool when the tool is removed. In some embodiments, no amount of curable composition remains adhered to the tool when the tool is removed.

In some examples, the curable composition of the various embodiments described herein does not require heat for curing, although heat can be used to accelerate the curing process. Further, in some embodiments, the curable composition is prepared using a hot melt process, thereby avoiding the need for volatile solvents, since solvents are often undesirable because of costs associated with procurement, handling, and disposal.

Useful components in the curable composition that is used the abrasive layer are enumerated and described in greater detail herein.

In some embodiments, the polymerizable epoxy-acrylate resin component included in the curable composition comprises a tetrahydrofurfuryl (THF) (meth)acrylate copolymer component; one or more epoxy resins; and one or more hydroxy-functional polyethers.

The tetrahydrofurfuryl (THF) (meth)acrylate copolymer component is formed from a polymerizable mixture. Unless otherwise specified, THF acrylates and methacrylates will be abbreviated as THFA. More specifically, the curable composition comprises a THFA copolymer component formed from a polymerizable composition comprising one or more tetrahydrofurfuryl (meth)acrylate monomers, one or more $C_1$-$C_8$ (meth)acrylate ester monomers, one or more optional cationically reactive functional (meth)acrylate monomers, one or more chain transfer agents, and one or more photoinitiators.

The THFA copolymer component comprises a $C_1$-$C_8$ alkyl (meth)acrylate ester monomer. Useful monomers include the acrylates and methacrylate of methyl, ethyl, propyl, isopropyl, butyl, pentyl, hexyl, heptyl and octyl alcohols, including all isomers, and mixtures thereof. In some embodiments, the alcohol is selected from $C_3$-$C_6$ alkanols, and in certain embodiments, the carbon number molar average of the alkanols is $C_3$-$C_6$. It has been found that within this range the copolymer has sufficient miscibility with the epoxy resin component described herein.

In addition, the THFA copolymer component may contain a cationically reactive monomer (e.g., a (meth)acrylate monomer having a cationically reactive functional group). Examples of such monomers include, for example, glycidyl acrylate, glycidyl methacrylate, hydroxyethyl acrylate, hydroxyethyl methacrylate, hydroxypropyl methylacrylate, hydroxybutyl acrylate and alkoxysilylalkyl (meth)acrylates, such as trimethoxysilylpropyl acrylate.

In some embodiments, the copolymer is formed from a polymerizable mixture comprising one or more chain transfer agents that function to, among other things, control the molecular weight of the resultant THFA copolymer component. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

In some embodiments, the THFA copolymer component contains essentially no acid functional monomers, whose presence could initiate polymerization of the epoxy resin prior to UV curing of the curable composition. In some embodiments, the copolymer also does not contain any amine-functional monomers. Furthermore, in some embodiments, the copolymer does not contain any acrylic monomers having moieties sufficiently basic so as to inhibit cationic cure of a curable composition.

The THFA copolymer generally comprises polymerized monomer units of: (A) 40-60 wt % (e.g., 50-60 wt % and 45-55 wt %) of tetrahydrofurfuryl (meth)acrylate; (B) 40-60 wt % (e.g., 40-50 wt % and 45-55 wt %) of $C_1$-$C_8$ (e.g., $C_3$-$C_6$) alkyl (meth)acrylate ester monomers; and (C) 0-10 wt % (e.g., 1-5 wt %, 0-5 wt %, and 0-2 wt %) of cationically reactive functional monomers, wherein the sum of A)-C) is 100 wt %.

The curable compositions of the various embodiments described herein can comprise one or more THFA copolymers in various amounts, depending on the desired properties of the abrasive layer (cured and/or uncured). In some embodiments, the curable compositions comprises one or more THFA copolymers in an amount of from 15-50 parts (e.g., 25-35 parts), by weight based on 100 parts total weight of monomers/copolymers in the curable compositions.

The curable compositions may include one or more thermoplastic polyesters. Suitable polyester components include semi-crystalline polyesters as well as amorphous and branched polyesters. But in some embodiments, the curable compositions of the various embodiments described herein contain substantially no thermoplastic polyesters; no more than trace amounts of thermoplastic polyesters; or amounts that will not materially affect the characteristics of the curable compositions.

Thermoplastic polyesters may include polycaprolactones and polyesters having hydroxyl and carboxyl termination, and may be amorphous or semi-crystalline at room temperature. In some embodiments, the polyesters are hydroxyl terminated polyesters that are semi-crystalline at room temperature. A material that is "amorphous" has a glass transition temperature but does not display a measurable crystalline melting point as determined on a differential scanning calorimeter ("DSC"). In some embodiments, the glass transition temperature is less than about 100° C. A material that is "semi-crystalline" displays a crystalline melting point as determined by DSC, in some embodiments, with a maximum melting point of about 120° C.

Crystallinity in a polymer can also be reflected by the clouding or opaqueness of a sheet that had been heated to an amorphous state as it cools. When the polyester polymer is heated to a molten state and knife-coated onto a liner to form a sheet, it is amorphous and the sheet is observed to be clear and fairly transparent to light. As the polymer in the sheet material cools, crystalline domains form and the crystallization is characterized by the clouding of the sheet to a translucent or opaque state. The degree of crystallinity may be varied in the polymers by mixing in any compatible combination of amorphous polymers and semi-crystalline polymers having varying degrees of crystallinity. It is generally preferred that material heated to an amorphous state be allowed sufficient time to return to its semi-crystalline state before use or application. The clouding of the sheet provides a convenient non-destructive method of determining that crystallization has occurred to some degree in the polymer.

The polyesters may include nucleating agents to increase the rate of crystallization at a given temperature. Useful nucleating agents include microcrystalline waxes. A suitable wax could include an alcohol comprising a carbon chain having a length of greater than 14 carbon atoms (CAS #71770-71-5) or an ethylene homopolymer (CAS #9002-88-4) sold by Baker Hughes, Houston, Texas, as UNILIN™ 700.

In some embodiments, the polyesters are solid at room temperature. The polyesters can have a number average molecular weight of about 7,500 g/mol to 200,000 g/mol (e.g., from about 10,000 g/mol to 50,000 g/mol and from about 15,000 g/mol to 30,000 g/mol).

Polyesters useful for use in the curable compositions of the various embodiments described herein comprise the reaction product of dicarboxylic acids (or their diester equivalents) and diols. The diacids (or diester equivalents) can be saturated aliphatic acids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic acids are succinic, glutaric, adipic, pimelic, suberic, azelaic, sebacic, 1,12-dodecanedioic, 1,4-cyclohexanedicarboxylic, 1,3-cyclopentanedicarboxylic, 2-me thylsuccinic, 2-methylpentanedioic, 3-methylhexanedioic acids, and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylthioether dicarboxylic acid, and 4,4'-diphenylamine dicarboxylic acid. In some embodiments, the structure between the two carboxyl groups in the diacids contain only carbon and hydrogen atoms. In some specific embodiments, the structure between the two carboxyl groups in the diacids is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, cyclobutane-1,3-di(2'-ethanol), cyclohexane-1,4-dimethanol, 1,10-decanediol, 1,12-dodecanediol, and neopentyl glycol. Long chain diols including poly(oxyalkylene)glycols in which the alkylene group contains from 2 to 9 carbon atoms (e.g., 2 to 4 carbon atoms), may also be used. Blends of the foregoing diols may be used.

Useful, commercially available hydroxyl terminated polyester materials include various saturated linear, semicrystalline copolyesters available from Evonik Industries, Essen, North Rhine-Westphalia, Germany, such as DYNAPOL™ S1401, DYNAPOL™ S1402, DYNAPOL™ S1358, DYNAPOL™ S1359, DYNAPOL™ S1227, and DYNAPOL™ S1229. Useful saturated, linear amorphous copolyesters available from Evonik Industries include DYNAPOL™ 1313 and DYNAPOL™ S1430.

The curable compositions may include one or more thermoplastic polyesters in an amount that varies depending on the desired properties of the abrasive layer. In some embodiments, the curable compositions include one or more thermoplastic polyesters in an amount of up to 50 percent by weight, based on the total weight of monomers/copolymers in the curable compositions. Where present, the one or more thermoplastic polyesters are present, in some embodiments, in an amount of at least 5 percent, at least 10 percent, at least 12 percent, at least 15 percent, or at least 20 percent by weight based on the total weight of monomers/copolymers in the composition. Where present, the one or more thermoplastic polyesters are, in some embodiments, present in an amount of at most 20 percent, at most 25 percent, at most 30 percent, at most 40 percent, or at most 50 percent by weight based on the total weight of monomers/copolymers in the curable compositions.

In some embodiments, the curable compositions comprise one or more epoxy resins, which are polymers comprising at least one epoxide functional group. Epoxy resins or epoxides that are useful in the composition of the present disclosure may be any organic compound having at least one oxirane ring that is polymerizable by ring opening. In some examples, the average epoxy functionality in the epoxy resins is greater than one, and, in some instances, at least two. The epoxides can be monomeric or polymeric, and aliphatic, cycloaliphatic, heterocyclic, aromatic, hydrogenated, or mixtures thereof. In some examples, epoxides contain more than 1.5 epoxy group per molecule and, in some instances, at least 2 epoxy groups per molecule. The useful materials typically have a weight average molecular weight of 150 g/mol to 10,000 g/mol (e.g., 180 g/mol to 1,000 g/mol). The molecular weight of the epoxy resin can be selected to provide the desired properties of the curable compositions or the cured compositions. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendant epoxy groups (e.g., a glycidyl methacrylate polymer or copolymer), and mixtures thereof. The epoxide-containing materials include compounds having the general formula:

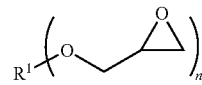

wherein $R^1$ is alkyl, alkoxy or aryl and n is an integer from 1 to 6.

Epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Also useful are polyhydric phenolic formaldehyde condensation products as well as polyglycidyl ethers that contain as reactive groups only epoxy groups or hydroxy groups. Useful curable epoxy resins are also described in various publications including, for example, Lee and Nevil, Handbook of Epoxy Resins (McGraw-Hill Book Co. 1967) and Encyclopedia of Polymer Science and Technology, 6, p. 322 (1986).

The choice of the epoxy resin used can depend upon its intended end use. For example, epoxides with "flexible backbones" may be desired where a greater amount of ductility is needed. Materials such as diglycidyl ethers of bisphenol A and diglycidyl ethers of bisphenol F can provide desirable structural properties that these materials attain upon curing, while hydrogenated versions of these epoxies may be useful for compatibility with substrates having oily surfaces.

Examples of commercially available epoxides useful in the present disclosure include diglycidyl ethers of bisphenol A (e.g., those available under the trade names EPON™ 828, EPON™ 1001, EPON™ 1004, EPON™ 2004, EPON™ 1510, and EPON™ 1310 from Momentive Specialty Chemicals, Inc., Waterford, NY; those under the trade designations D.E.R.™ 331, D.E.R.™ 332, D.E.R.™ 334, and D.E.N.™ 439 available from Dow Chemical Co., Midland, MI; and those available under the trade name EPONEX™ 1510 available from Hexion); diglycidyl ethers of bisphenol F (that are available, e.g., under the trade designation ARALDITE™ GY 281 available from Huntsman Corporation); silicone resins containing diglycidyl epoxy functionality; flame retardant epoxy resins (e.g., that are available under the trade designation D.E.R.™ 560, a brominated bisphenol type epoxy resin available from Dow Chemical Co.); and 1,4-butanediol diglycidyl ethers.

Epoxy containing compounds having at least one glycidyl ether terminal portion, and in some instances, a saturated or unsaturated cyclic backbone may optionally be added to the curable compositions as reactive diluents. Reactive diluents may be added for various purposes such as to aid in processing, e.g., to control the viscosity in the curable compositions as well as during curing, make the cured composition more flexible, and/or compatibilize materials in the composition.

Examples of such diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N'N'-tetraglycidyl meta-xylylene diamine, and vegetable oil polyglycidyl ether. Reactive diluents are commercially available as HELOXY™ 107 and CARDURA™ N10 from Momentive Specialty Chemicals, Inc. The composition may contain a toughening agent to aid in providing, among other features, peel resistance and impact strength.

The curable compositions can contain one or more epoxy resins having an epoxy equivalent weight of from 100 g/mol to 1500 g/mol. In some instances, the curable compositions contain one or more epoxy resins having an epoxy equivalent weight of from 300 g/mol to 1200 g/mol. And in other embodiments, the curable compositions of the various embodiments described herein contain two or more epoxy resins, wherein at least one epoxy resin has an epoxy equivalent weight of from 150 g/mol to 250 g/mol, and at least one epoxy resin has an epoxy equivalent weight of from 500 g/mol to 600 g/mol.

The curable compositions may comprise one or more epoxy resins in an amount, which varies depending on the desired properties of the curable compositions that make up the abrasive layer of the abrasive article of the various embodiments described herein. In some embodiments, the curable compositions comprise one or more epoxy resins in an amount of at least 20, at least 25, at least 35, at least 40, at least 50 parts, or at least 55 parts by weight, based on the 100 parts total weight of the composition. In some embodiments, the one or more epoxy resins are present in an amount of at most 45, at most 50 parts, at most 75 parts, or at most 80 parts by weight, based on the 100 parts total weight of the monomers/copolymers in the curable compositions.

Vinyl ethers represent a different class of monomers that, like epoxy resins, are cationic polymerizable. These monomers can be used as an alternative to, or in combination with, the epoxy resins disclosed herein.

While not wishing to be bound by any specific theory, it is believed that the vinyl ether monomer has a high electron density of double bonds and produces a stable carbocation, enabling this monomer to have high reactivity in cationic polymerizations. To avoid inhibiting the cationic polymerization, the vinyl ether monomer may be limited to those not containing nitrogen. Examples thereof include methyl vinyl ether, ethyl vinyl ether, tert-butyl vinyl ether, isobutyl vinyl ether, triethylene glycol divinyl ether, and 1,4-cyclohexane dimethanol divinyl ether. Preferred examples of the vinyl ether monomer include triethylene glycol divinyl ether and cyclohexane dimethanol divinyl ether (both sold under the trade designation RAPI-CURE by Ashland, Inc., Covington, Kentucky).

The curable compositions can further include one or more hydroxy-functional polyether. In some embodiments, the one or more hydroxy-functional polyether are liquid at a temperature of 25° C. and pressure of 1 atm (101 kilopascals). In some embodiments, the one or more hydroxy-functional polyethers include a polyether polyol. The polyether polyol can be present in an amount of at least 5 parts, at least 10 parts, or at most 15 parts relative to 100 parts total weight of monomers/copolymers in the composition. In some embodiments, the polyether polyol is present in an amount of at most 15 parts, at most 20 parts, or at most 30 parts relative to 100 parts total weight of monomers/copolymers in the composition.

Examples of hydroxy-functional polyethers include, but are not limited to, polyoxyethylene and polyoxypropylene glycols; polyoxyethylene and polyoxypropylene triols and polytetramethylene oxide glycols.

Suitable hydroxy-functional poly(alkylenoxy) compounds include, but are not limited to, the POLYMEG™ series of polytetramethylene oxide glycols (from Lyondellbasell, Inc., Jackson, TN), the TERATHANE™ series of polytetramethylene oxide glycols (from Invista, Newark, DE); the POLYTHF™ series of polytetramethylene oxide glycol (from BASF SE, Ludwigshafen, Germany); the ARCOL™ series of polyoxypropylene polyols (from Bayer MaterialScience LLC, Pittsburgh, PA) and the VORANOL™ series of polyether polyols (from Dow Chemical Company, Midland, MI).

The curable compositions of the various embodiments described herein, that are used to form the abrasive layer can further contain one or more hydroxyl-functional film-forming polymers having at least one and, in some instances, at least two hydroxyl groups. As used herein, the term "hydroxyl-functional film-forming polymer" does not include the polyether polyols described herein, which also contain hydroxyl groups. In some embodiments, the film-forming polymer are substantially free of other "active hydrogen" containing groups such as amino and mercapto moieties. Further, the film-forming polymer or polymers can also be substantially free of groups, which may be thermally and/or photolytically unstable so that the compounds will not decompose when exposed to UV radiation and, in some instances, heat during curing.

The hydroxyl-containing film-forming polymer contains two or more primary or secondary aliphatic hydroxyl groups (i.e., the hydroxyl group is bonded directly to a non-aromatic carbon atom). In some embodiments, the hydroxyl-functional film-forming polymer has a hydroxyl number of at least 0.01. While not wishing to be bound by any specific theory, it is believed the hydroxyl groups participate in the cationic polymerization with the epoxy resin.

The hydroxyl-functional film-forming polymer may be selected from phenoxy resins, ethylene-vinyl acetate ("EVA") copolymers, polycaprolactone polyols, polyester polyols, and polyvinyl acetal resins that are solid under ambient conditions. In some embodiments, the hydroxyl-functional film-forming polymer is solid at a temperature of 25° C. and pressure of 1 atm (101 kilopascals). The hydroxyl group may be terminally situated, or may be pendent from a polymer or copolymer. In some embodiments, the addition of a film-forming polymer to the curable compositions of the various embodiments described herein can improve the dynamic overlap shear strength and/or decrease the cold flow of the curable compositions used to make the abrasive layer.

One useful class of hydroxyl-containing film-forming polymers is hydroxy-containing phenoxy resins. Desirable phenoxy resins include those derived from the polymerization of a diglycidyl bisphenol compound. Typically, the phenoxy resin has a number average molecular weight of less than 60,000 g/mol (e.g., in the range of 20,000 g/mol to 30,000 g/mol). Commercially available phenoxy resins include, but are not limited to, PAPHEN™ PKHP-200, available from Inchem Corp., Rock Hill, SC and the SYN FAC™ series of polyoxyalkylated bisphenol A from Milliken Chemical, Spartanburg, SC) such as SYN FAC™ 8009, 8024, 8027, 8026, and 8031.

Another useful class of hydroxyl-containing film-forming polymers is that of EVA copolymer resins. While not wishing to be bound by any specific theory, it is believed that these resins contain small amounts of free hydroxyl groups, and that EVA copolymers are further deacetylated during cationic polymerization. Hydroxyl-containing EVA resins can be obtained, for example, by partially hydrolyzing a precursor EVA copolymer.

Suitable ethylene-vinyl acetate copolymer resins include, but are not limited to, thermoplastic EVA copolymer resins containing at least 28 percent by weight vinyl acetate. In one embodiment, the EVA copolymer comprises a thermoplastic copolymer containing at least 28 percent by weight vinyl acetate, desirably at least 40 percent by weight vinyl acetate (e.g., at least 50 percent by weight vinyl acetate and at least 60 percent by weight vinyl acetate) by weight of the copolymer. In a further embodiment, the EVA copolymer contains an amount of vinyl acetate in the range of from 28 to 99 weight percent of vinyl acetate (e.g., from 40 to 90 weight percent of vinyl acetate; from 50 to 90 weight percent of vinyl acetate; and from 60 to 80 weight percent vinyl acetate) in the copolymer.

Examples of commercially available EVA copolymers include, but are not limited to, the ELVAX™ series, including ELVAX™ 150, 210, 250, 260, and 265 from E. I. Du Pont de Nemours and Co., Wilmington, DE, ATEVA™ series from Celanese, Inc., Irving, TX); LEVAPREN™ 400 from Bayer Corp., Pittsburgh, PA including LEVAPREN™ 450, 452, and 456 (45 weight percent vinyl acetate); LEVAPREN™ 500 HV (50 weight percent vinyl acetate); LEVAPREN™ 600 HV (60 weight percent vinyl acetate); LEVAPREN™ 700 I-TV (70 weight percent vinyl acetate); and LEVAPREN™ KA 8479 (80 weight percent vinyl acetate), each from Lanxess Corp., Cologne, Germany.

Additional useful film-forming polymers include the TONE™ series of polycaprolactone polyols series available from Dow Chemical, the CAPA™ series of polycaprolactone polyols from Perstorp Inc., Perstorp, Sweden, and the DESMOPHEN™ series of saturated polyester polyols from Bayer Corporation, Pittsburgh, PA, such as DESMOPHEN™ 631A 75.

The curable composition comprises one or more hydroxyl-containing film-forming polymers resins in an amount, which can vary depending on the desired properties of the curable composition, whether cured or uncured. The curable composition can include one or more hydroxyl-containing film-forming polymer resins in an amount of at least 10 parts, at least 15 parts, at least 20 parts, or at least 25 parts by weight, based on 100 parts total weight of monomers/copolymers in the composition. In some embodiments, the one or more hydroxyl-containing film-forming polymer resins can be present in an amount of at most 20 parts, at most 25 parts, or at most 50 parts, based on 100 parts total weight of monomers/copolymers in the composition.

Useful photoinitiators for use in the curable compositions of the various embodiments described herein include photoinitiators used to i) polymerize precursor polymers (for example, in some embodiments, tetrahydrofurfuryl (meth) acrylate copolymer) and ii) those used to ultimately polymerize the curable compositions.

Photoinitiators for the former include benzoin ethers such as benzoin methyl ether and benzoin isopropyl ether; substituted acetophenones such as 2,2 dimethoxy-1,2-diphenylethanone, available as IRGACURE™ 651 (BASF SE) or ESACURE™ KB-1 (Sartomer Co., West Chester, PA), dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. In some specific embodiments, the photoinitiators are substituted acetophenones.

In some embodiments, photoinitiators are photoactive compounds that undergo a Norrish I cleavage to generate free radicals that can initiate by addition to the acrylic double bonds. In some embodiments, such photoinitiators are present in an amount of from 0.1 to 1.0 pbw per 100 parts of the precursor polymer composition. Examples of such photoinitiators include, but are not limited to, ionic photoacid generators, which are compounds that can generate acids upon exposure to actinic radiation. These are extensively used to initiate cationic polymerizations, in which case they are referred to as cationic photoinitiators.

Useful ionic photoacid generators include bis(4-t-butylphenyl) iodonium hexafluoroantimonate (FP5034™ from Hampford Research Inc., Stratford, CT), a mixture of triarylsulfonium salts (diphenyl(4-phenylthio) phenylsufonium hexafluoroantimonate, bis(4-(diphenylsulfonio)phenyl)sulfide hexafluoroantimonate) available as SynaPI6976™ from Synasia Metuchen, NJ, (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy) phenyl]phenyliodonium hexafluoroantimonate), (4-isopropylphenyl)(4-methylphenyl)iodonium tetrakis (pentafluorophenyl) borate (available as Rhodorsil 2074™ from Bluestar Silicones, East Brunswick, NJ), bis(4-methylphenyl) iodonium hexafluorophosphate (available as Omnicat440™ from IGM Resins Bartlett, IL), 4-(2-hydroxy-1-tetradecyloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsufonium hexafluorophosphate, bis(4-(diphenylsulfonio)phenyl)sulfide bis(hexafluorophosphate), diphenyl(4-phenylthio)phenylsufonium hexafluoroantimonate, bis(4-(diphenylsulfonio)phenyl)sulfide hexafluoroantimonate, and blends of these triarylsulfonium salts available from Synasia, Metuchen, NJ as SYNA™ PI-6992 and SYNA™ PI-6976 for the PF6 and SbF6 salts, respectively. Similar blends of ionic photoacid generators are available from Aceto Pharma Corporation, Port Washington, NY as UVI-6992 and UVI-6976.

The photoinitiator is used in amounts sufficient to effect the desired degree of crosslinking of the copolymer. The desired degree of crosslinking may vary, depending on the desired properties of the abrasive layer (whether cured or uncured) or the thickness of the abrasive layer (whether cured or uncured). The amount of the photoinitiator necessary to effect the desired degree of crosslinking will depend on the quantum yield of the photoinitiator (the number of molecules of acid released per photon absorbed), the permeability of the polymer matrix, the wavelength and duration of irradiation and the temperature. Generally the photoinitiator is used in amounts of at least 0.001 parts, at least 0.005 parts, at least 0.01 parts, at least 0.05 parts, at least 0.1 parts, or at least 0.5 parts by weight relative to 100 parts by weight of total monomer/copolymer in the composition. The photoinitiator is generally used in amounts of at most 5 parts, at most 3 parts, at most 1 part, at most 0.5 parts, at most 0.3 parts, or at most 0.1 parts by weight relative to 100 parts by weight of total monomer/copolymer in the composition.

The curable compositions of the various embodiments described herein may further contain any of a number of optional additives. Such additives may be homogeneous or heterogeneous with one or more components in the composition. Heterogenous additives may be discrete (e.g., particulate) or continuous in nature.

Aforementioned additives can include, for example, fillers, stabilizers, plasticizers, tackifiers, flow control agents, cure rate retarders, adhesion promoters (for example, silanes such as (3-glycidoxypropyl)trimethoxysilane (GPTMS), and titanates), adjuvants, impact modifiers, expandable microspheres, thermally conductive particles, electrically conductive particles, and the like, such as silica, glass, clay, talc, pigments, colorants, glass beads or bubbles, and antioxidants, so as to reduce the weight and/or cost of the structural layer composition, adjust viscosity, and/or provide additional reinforcement or modify the thermal conductivity of compositions and articles used in the provided methods so that a more rapid or uniform cure may be achieved.

In some embodiments, the curable compositions can contain one or more fiber reinforcement materials. The use of a fiber reinforcement material can provide an abrasive layer having improved cold flow properties, limited stretchability, and enhanced strength. Preferably, the one or more fiber reinforcement materials have a certain degree of porosity that enables the photoinitiator, which can be dispersed throughout the, to be activated by UV light and properly cured without the need for heat.

The one or more fiber reinforcements may comprise one or more fiber-containing webs including, but not limited to, woven fabrics, nonwoven fabrics, knitted fabrics, and a unidirectional array of fibers. The one or more fiber reinforcements could comprise a nonwoven fabric, such as a scrim.

Materials for making the one or more fiber reinforcements may include any fiber-forming material capable of being formed into one of the above-described webs. Suitable fiber-forming materials include, but are not limited to, polymeric materials such as polyesters, polyolefins, and aramids; organic materials such as wood pulp and cotton; inorganic materials such as glass, carbon, and ceramic; coated fibers having a core component (e.g., any of the above fibers) and a coating thereon; and combinations thereof.

Further options and advantages of the fiber reinforcement materials are described in U.S. Patent Publication No. 2002/0182955 (Weglewski et al.).

As discussed herein, the polymerizable composition used to form the THFA copolymer component, the curable compositions used to form the abrasive layer, and/or the compositions used to make the size coat may be irradiated using various activating UV light sources to polymerize (e.g., photopolymerize) one or more component(s).

Light sources based on light emitting diodes can enable a number of advantages. These light sources can be monochromatic, which for the purposes of this disclosure implies that the spectral power distribution is characterized by a very narrow wavelength distribution (e.g., confined within a 50 nm range or less). Monochromatic ultraviolet light can reduce thermal damage or harmful deep UV effects to coatings and substrates being irradiated. In larger scale applications, the lower power consumption of UV-LED sources can also allow for energy savings and reduced environmental impact.

In some embodiments, matching the spectral power distribution of the photoinitiator with the absorption spectrum of UV light source too closely can result in inferior curing of thick abrasive layers. While not wishing to be bound by any specific theory, it is believed that aligning the peak output of the UV source with the excitation wavelength of the photoinitiator can be undesirable because it leads to formation of a "skin" layer that dramatically increases the viscosity of the monomer mixture and progressively hinders the ability of available monomer to access reactive polymer chain ends. The result of this lack of access is a layer of uncured, or only partially cured, abrasive layer beneath the skin layer and subsequent failure of the abrasive layer to, e.g., retain abrasive particles.

This technical problem can be alleviated by using a UV light source with a spectral power distribution that is offset from the primary excitation wavelength at which the photoinitiator is activated. As used herein, "offset" between the spectral power distribution and a given wavelength means that the given wavelength does not overlap with wavelengths over which the output of the UV light source has significant intensity. In one embodiment, the offset referred to above is a positive offset (e.g., the spectral power distribution spans wavelengths that are higher than the primary excitation wavelength of the photoinitiator).

In this disclosure, the primary excitation wavelength can be defined at the highest wavelength absorption peak (e.g., the local maximum absorption peak located at the highest wavelength) in the UV absorption curve of the photoinitiator, as determined by spectroscopic measurement at a photoinitiator concentration of 0.03 wt % in acetonitrile solution.

In some embodiments, the highest wavelength absorption peak is located at a wavelength of at most 395 nm, at most 375 nm, or at most 360 nm.

In some embodiments, the difference in wavelength between the highest wavelength absorption peak of the photoinitiator and the peak intensity of the UV light source is in the range of from 30 nm to 110 nm, preferably from 40 nm to 90 nm, and more preferably from 60 nm to 80 nm.

The UV radiation exposure time required to obtain sufficient activation of the photoinitiator(s) is not particularly restricted. In some embodiments, the curable composition is exposed to ultraviolet radiation over an exposure period of at least 0.25 seconds, at least 0.35 seconds, at least 0.5 seconds, or at least 1 second. The curable composition can be exposed to ultraviolet radiation over an exposure period of at most 10 minutes, at most 5 minutes, at most 2 minutes, at most 1 minute, or at most 20 seconds.

Based on the exposure time used, the UV radiation should provide a sufficient energy density to obtain a functional cure. In some embodiments, the UV radiation can deliver an energy density of at least 0.5 $J/cm^2$, at least 0.75 $J/cm^2$, or at least 1 $J/cm^2$. In the same or alternative embodiments, the UV radiation can deliver an energy density of at most 15 $J/cm^2$, at most 12 $J/cm^2$, or at most 10 $J/cm^2$.

The abrasive article of the various embodiments described herein include an abrasive layer, such as any of abrasive layers 112, 212, and 312. The abrasive layer is a layer containing a hard mineral that serves to abrade a workpiece. In FIGS. 1-3, the abrasive layer is a coated abrasive film that includes a plurality of abrasive particles 114 secured to an abrasive layer of the various embodiments described herein. The abrasive particles 114 are adhesively coupled to the optional backing by implementing a sequence of coating operations involving the abrasive layer 116 and size coat 118. As mentioned herein, the abrasive layer results from the curing of the curable composition.

In the configuration shown in FIGS. 1-3, the abrasive particles 114 are partially or fully embedded in at least the abrasive layer 116 in close proximity to the surface of the abrasive article 100. This allows the abrasive particles 114 to easily come into frictional contact with the workpiece when the abrasive article 100 is rubbed against the workpiece.

A wide variety of abrasive particles may be utilized in the various embodiments described herein. The particular type of abrasive particle (e.g. size, shape, chemical composition) is not considered to be particularly significant to the abrasive article, so long as at least a portion of the abrasive particles are suitable for the intended end-use application. Suitable abrasive particles may be formed of, for example, cubic boron nitride, zirconia, alumina, silicon carbide and diamond.

The abrasive particles may be provided in a variety of sizes, shapes and profiles, including, for example, random or crushed shapes, regular (e.g. symmetric) profiles such as square, star-shaped or hexagonal profiles, and irregular (e.g. asymmetric) profiles.

The abrasive article may include a mixture of abrasive particles that are inclined on the backing (i.e. stand upright and extend outwardly from the backing) as well as abrasive particles that lie flat on their side (i.e. they do not stand upright and extend outwardly from the backing).

The abrasive article may include a mixture of different types of abrasive particles. For example, the abrasive article may include mixtures of platey and non-platey particles, crushed and shaped particles (which may be discrete abrasive particles that do not contain a binder or agglomerate abrasive particles that contain a binder), conventional non-shaped and non-platey abrasive particles (e.g. filler material) and abrasive particles of different sizes.

Examples of suitable shaped abrasive particles can be found in, for example, U.S. Pat. No. 5,201,916 (Berg) and U.S. Pat. No. 8,142,531 (Adefris et al.) A material from which the shaped abrasive particles may be formed comprises alpha alumina. Alpha alumina shaped abrasive particles can be made from a dispersion of aluminum oxide monohydrate that is gelled, molded to shape, dried to retain the shape, calcined, and sintered according to techniques known in the art.

U.S. Pat. No. 8,034,137 (Erickson et al.) describes alumina crushed abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them). Details concerning such shaped abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Examples of suitable crushed abrasive particles include crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, MN, brown aluminum oxide, blue aluminum oxide, silicon carbide (including green silicon carbide), titanium diboride, boron carbide, tungsten carbide, garnet, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Further examples include crushed abrasive composites of abrasive particles (which may be platey or not) in a binder matrix, such as those described in U.S. Pat. No. 5,152,917 (Pieper et al.).

Examples of sol-gel-derived abrasive particles from which crushed abrasive particles can be isolated, and methods for their preparation can be found in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the crushed abrasive particles could comprise abrasive agglomerates such as, for example, those described in U.S. Pat. No. 4,652,275 (Bloecher et al.) or U.S. Pat. No. 4,799,939 (Bloecher et al.).

The crushed abrasive particles comprise ceramic crushed abrasive particles such as, for example, sol-gel-derived polycrystalline alpha alumina particles. Ceramic crushed abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.).

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Patent Publication No. 2009/0165394 A1 (Culler et al.). Examples of suitable platey crushed abrasive particles can be found in, for example, U.S. Pat. No. 4,848,041 (Kruschke).

The abrasive particles may be surface-treated with a coupling agent (e.g., an organosilane coupling agent) or other physical treatment (e.g., iron oxide or titanium oxide) to enhance adhesion of the crushed abrasive particles to the binder.

The abrasive layer, in some embodiments, includes a particulate mixture comprising a plurality of formed abrasive particles (e.g., precision shaped grain (PSG) mineral particles available from 3M, St. Paul, MN, which are described in greater detail herein; not shown in FIGS. 1-3) and a plurality of abrasive particles 114, or only formed abrasive particles, adhesively secured to the abrasive layer.

In some examples, the formed abrasive particles and the abrasive particles 114 are substantially on the same plane, such that at rest, the formed abrasive particles and the abrasive particles 114 simultaneously contact the surface to be cut with the abrasive article. In other examples, the formed abrasive particles and the abrasive particles 114 can be arranged as shown in FIGS. 1-3, wherein the formed abrasive particles and the abrasive particles 114 are on a different plane, such that at rest, substantially only the formed abrasive particles simultaneously contact the surface to be cut with the abrasive article. In still other examples, the formed abrasive particles and the abrasive particles 114 can be arranged such that the formed abrasive particles and the abrasive particles 114 are on a different plane, such that at rest, substantially only the abrasive particles 114 simultaneously contact the surface to be cut with the abrasive article.

Whether the formed abrasive particles and the abrasive particles 114 are on the same or a different plane will depend, in some examples, on the relative size of the formed abrasive particles and the abrasive particles 114. And one can select, in some examples, the relative sizes of the formed abrasive particles and the abrasive particles 114 to achieve any of the arrangements described herein where the formed abrasive particles and the abrasive particles 114 are on the same or different planes.

As used herein, the term "formed abrasive particles" generally refers to abrasive particles (e.g., formed ceramic abrasive particles) having at least a partially replicated shape. Non-limiting processes to make formed abrasive particles include shaping the precursor abrasive particle in a mold having a predetermined shape, extruding the precursor abrasive particle through an orifice having a predetermined shape, printing the precursor abrasive particle though an opening in a printing screen having a predetermined shape, or embossing the precursor abrasive particle into a predetermined shape or pattern. Non-limiting examples of formed abrasive particles are disclosed in Published U.S. Patent Appl. No. 2013/0344786, which is incorporated by reference as if fully set forth herein. Non-limiting examples of formed abrasive particles include shaped abrasive particles formed in a mold, such as triangular plates as disclosed in U.S. Pat. Nos. RE 35,570; 5,201,916, and 5,984,998 all of which are incorporated by reference as if fully set forth herein; or extruded elongated ceramic rods/filaments often having a circular cross section produced by Saint-Gobain Abrasives an example of which is disclosed in U.S. Pat. No. 5,372,620, which is incorporated by reference as if fully set forth herein. Formed abrasive particle as used herein excludes randomly sized abrasive particles obtained by a mechanical crushing operation.

Formed abrasive particles also include shaped abrasive particles. As used herein, the term "shaped abrasive particle," generally refers to abrasive particles with at least a portion of the abrasive particles having a predetermined shape that is replicated from a mold cavity used to form the shaped precursor abrasive particle. Except in the case of abrasive shards (e.g. as described in U.S. patent publication US 2009/0169816), the shaped abrasive particle will generally have a predetermined geometric shape that substantially replicates the mold cavity that was used to form the shaped abrasive particle. Shaped abrasive particle as used herein excludes randomly sized abrasive particles obtained by a mechanical crushing operation.

Formed abrasive particles also include "platey crushed abrasive particles," such as those described in Published PCT Appl. No. WO2016/160357, which is incorporated by reference as if fully set forth herein. Briefly, the term "platey crushed abrasive particle," generally refers to crushed abrasive particles resembling a platelet and/or flake that is characterized by a thickness that is less than the width and length. For example, the thickness may be less than ½, ⅓, ¼, ⅕, ⅙, ⅐, ⅛, ⅑, or even less than ⅒ of the length and/or width. Likewise, the width may be less than ½, ⅓, ¼, ⅕, ⅙, ⅐, ⅛, ⅑, or even less than ⅒ of the length.

Formed abrasive particles also include precision-shaped grain (PSG) mineral particles, such as those described in Published U.S. Appl. No. 2015/267097, which is incorporated by reference as if fully set forth herein.

The formed abrasive particles and the abrasive particles can be made of the same or different materials. For example, formed abrasive particles and the abrasive particles 114 are not limited and may be composed of any of a variety of hard minerals known in the art. Examples of suitable abrasive particles include, for example, fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles, silica, iron oxide, chromia, ceria, zirconia, titania, tin oxide, gamma alumina, and mixtures thereof. The alumina abrasive particles may contain a metal oxide modifier. The diamond and cubic boron nitride abrasive particles may be monocrystalline or polycrystalline.

The formed abrasive particles can be made according to methods known in the art including the methods described in Published U.S. Appl. Nos. 2015/267097 and 2016/0311084, which are incorporated by reference as if fully set forth herein.

In some examples, formed abrasive particles can be selected to have a length in a range of from about 1 micron to about 15000 microns, about 10 microns to about 10000 microns, and from about 150 to about 2600 microns, although other lengths may also be used. Formed abrasive particles can also be selected to have a width in a range of from about 0.1 micron to about 3500 microns, about 100 microns to about 3000 microns, and about 100 microns to about 2600 microns, although other lengths may also be used. As used herein in referring to formed abrasive particles, the term "length" refers to the maximum dimension of a shaped abrasive particle. "Width" refers to the maximum dimension of the shaped abrasive particle that is perpendicular to the length. The terms "thickness" or "height" refer to the dimension of the shaped abrasive particle that is perpendicular to the length and width.

In some examples, the formed abrasive particles have a substantially monodisperse particle size of from about 80 micrometers to about 150 micrometers (e.g., from about 75 micrometers to about 150 micrometers; about 90 micrometers to about 110 micrometers; about 90 micrometers to about 100 micrometers; about 85 micrometers to about 110 micrometers; or about 95 micrometers to about 120 micrometers). As used herein, the term "substantially monodisperse particle size" is used to describe formed abrasive particles having a size that does not vary substantially. Thus, for example, when referring to formed abrasive particles (e.g., a PSG mineral particles) having a particle size of 100 micrometers, greater than 90%, greater than 95% or greater than 99% of the formed abrasive particles will have a particle having its largest dimension be 100 micrometers In contrast, the abrasive particles 114 can have a range or distribution of particle sizes. Such a distribution can be characterized by its median particle size. For instance, the median particle size of the abrasive particles may be at least 0.001 micrometers, at least 0.005 micrometers, at least 0.01 micrometers, at least 0.015 micrometers, or at least 0.02 micrometers. In some instances, the median particle size of the abrasive particles may be up to 300 micrometers, up to 275 micrometers, up to 250 micrometers, up to 150 micrometers, or up to 100 micrometers. In some examples, the median particle size of the abrasive particles is from about 50 micrometers to about 2000 micrometers (e.g., a median particle size from about 50 micrometers to about 100 micrometers; about 75 micrometers to about 150 micrometers; about 100 micrometers to about 200 micrometers; about 100 micrometers to about 250 micrometers; about 500 to about 1000 micrometers; or about 1000 micrometers to about 1700 micrometers).

In some examples, the formed abrasive particles and the abrasive particles are present in the particulate mixture comprised in the abrasive layer in different weight percent (wt. %) amounts relative to one another, based on the overall weight of the particulate mixture. In some examples, the particulate mixture comprises from about 0 wt. % to less than 10 wt. % formed abrasive particles (e.g., from about 1 wt. % to less than 10 wt. %, about 1 wt. % to about 5 wt. %; about 1 wt. % to about 3 wt. %; about 3 wt. % to about less than 10 wt. %; about 3 wt. % to about 5 wt. %; about 5 wt. % to about less than about 10 wt. %; or about 3 wt. % to about 8 wt. %).

In some examples, the particulate mixture comprises from about greater than 90 wt. % to about 99 wt. % abrasive particles (e.g., from about 91 wt. % to about 97 wt. %; about 92 wt. % to about 97 wt. %; about 95 wt. % to about 97 wt. %; or greater than about 90 wt. % to about 97 wt. %).

In some embodiments, the abrasive article of the various embodiments described herein include a size coat 118. In some examples, the size coat comprises the cured (e.g., photopolymerized) product of a bis-epoxide (e.g., 3,4-epoxy cyclohexylmethyl-3,4-epoxy cyclohexylcarboxylate, available from Daicel Chemical Industries, Ltd., Tokyo, Japan); a trifunctional acrylate (e.g., trimethylol propane triacrylate, available under the trade designation "SR351" from Sartomer USA, LLC, Exton, PA); an acidic polyester dispersing agent (e.g., "BYK W-985" from Byk-Chemie, GmbH, Wesel, Germany); a filler (e.g., a sodium-potassium alumina silicate filler, obtained under the trade designation "MINEX 10" from The Cary Company, Addison, IL); a photoinitiator (e.g., a triarylsulfonium hexafluoroantimonate/propylene carbonate photoinitiator, obtained under the trade designation "CYRACURE CPI 6976" from Dow Chemical Company, Midland, MI; and an α-Hydroxyketone photoinitiator, obtained under the trade designation "DAROCUR 1173" from BASF Corporation, Florham Park, NJ).

The abrasive article of the various embodiments described herein optionally include a backing, such as any of backings 110, 210, and 310. The backing may be constructed from any of a number of materials known in the art for making coated abrasive articles. Although not necessarily so limited, the backing can have a thickness of at least 0.02 millimeters, at least 0.03 millimeters, 0.05 millimeters, 0.07 millimeters, or 0.1 millimeters. The backing could have a thickness of up to 5 millimeters, up to 4 millimeters, up to 2.5 millimeters, up to 1.5 millimeters, or up to 0.4 millimeters.

In some examples, the backing is flexible and may be either solid (as shown in FIG. 1) or porous. Flexible backing materials include polymeric film (including primed films) such as polyolefin film (e.g., polypropylene including biaxially oriented polypropylene, polyester film, polyamide film, cellulose ester film), polyurethane rubber, metal foil, mesh, polymeric foam (e.g., natural sponge material or polyurethane foam), cloth (e.g., cloth made from fibers or yarns comprising polyester, nylon, silk, cotton, and/or rayon), scrim, paper, coated paper, vulcanized paper, vulcanized fiber, nonwoven materials, combinations thereof, and treated versions thereof. The backing may also be a laminate of two materials (e.g., paper/film, cloth/paper, film/cloth). Cloth backings may be woven or stitch bonded. In some examples, the backing is a thin and conformable polymeric film capable of expanding and contracting in transverse (i.e. in-plane) directions during use.

In some examples, a strip of such a backing material that is 5.1 centimeters (2 inches) wide, 30.5 centimeters (12 inches) long, and 0.102 millimeters (4 mils) thick and subjected to a 22.2 Newton (5 Pounds-Force) dead load longitudinally stretches at least 0.1%, at least 0.5%, at least 1.0%, at least 1.5%, at least 2.0%, at least 2.5%, at least 3.0%, or at least 5.0%, relative to the original length of the strip. In other examples, the backing strip longitudinally stretches up to 20%, up to 18%, up to 16%, up to 14%, up to 13%, up to 12%, up to 11%, or up to 10%, relative to the original length of the strip. The stretching of the backing material can be elastomeric (with complete spring back), inelastic (with zero spring back), or combination of elastomeric and inelastic stretching. This property can help promote contact between the abrasive particles and the underlying workpiece, and can be especially beneficial when the workpiece includes raised and/or recessed areas.

Useful backing materials can be highly conformable. Highly conformable polymers that may be used in the backing include certain polyolefin copolymers, polyurethanes, and polyvinyl chloride. An examples of a polyolefin copolymer is an ethylene-acrylic acid resin (available under the trade designation "PRIMACOR 3440" from Dow Chemical Company, Midland, MI). Optionally, ethylene-acrylic acid resin is one layer of a bilayer film in which the other layer is a polyethylene terephthalate ("PET") carrier film. In this example, the PET film is not part of the backing itself and is stripped off prior to using the abrasive article 100. While it is possible to strip the PET from the ethylene-acrylic acid resin surface, the ethylene-acrylic acid resin and the PET can also be bonded such that these two layers stay together during use of the abrasive article.

In some examples, the backing has a modulus of at least 10, at least 12, or at least 15 kilogram-force per square centimeter (kgf/cm$^2$). In some examples, the backing has a modulus of up to 200, up to 100, or up to 30 kgf/cm$^2$. The backing can have a tensile strength at 100% elongation (double its original length) of at least 200 kgf/cm$^2$, at least 300 kgf/cm$^2$, or at least 350 kgf/cm$^2$. The tensile strength of the backing can be up to 900 kgf/cm$^2$, up to 700 kgf/cm$^2$, or up to 550 kgf/cm$^2$. Backings with these properties can provide various options and advantages, some of which are described in U.S. Pat. No. 6,183,677 (Usui et al.), which is incorporated by reference as if fully set forth herein.

Optionally, the backing may have at least one of a saturant, presize layer, or backsize layer. These materials can be used to seal the backing or to protect yarn or fibers present in the backing. If the backing is a cloth material, at least one of these materials is typically used. Advantageously, the addition of the presize layer or backsize layer can provide a smoother surface on either the front and/or the back side of the backing. Other optional layers known in the art may also be used, as described in U.S. Pat. No. 5,700,302 (Stoetzel et al.), which is incorporated by reference as if fully set forth herein.

The abrasive article of the various embodiments described include a supersize coat, such as any of supersize coats 122, 222, and 322. In general, the supersize coat is the outermost coating of the abrasive article and directly contacts the workpiece during an abrading operation. The supersize coat is, in some examples, substantially transparent.

The term "substantially transparent" as used herein refers to a majority of, or mostly, as in at least about 30%, 40%, 50%, 60%, or at least about 70% or more transparent. In some examples, the measure of the transparency of any given coat described herein (e.g., the supersize coat) is the coat's transmittance. In some examples, the supersize coat displays a transmittance of at least 5 percent, at least 20 percent, at least 40 percent, at least 50 percent, or at least 60 percent (e.g., a transmittance from about 40 percent to about 80 percent; about 50 percent to about 70 percent; about 40 percent to about 70 percent; or about 50 percent to about 70 percent), according to a Transmittance Test that measures the transmittance of 500 nm light through a sample of 6 by 12 inch by approximately 1-2 mil (15.24 by 30.48 cm by 25.4-50.8 μm) clear polyester film, having a transmittance of about 98%.

One component of supersize coats can be a grinding aid. A grinding aid is defined as particulate material the addition of which to an abrasive article has a significant effect on the chemical and physical processes of abrading, thereby resulting in improved performance. In general, the addition of a grinding aid increases the useful life of a coated abrasive article. Grinding aids encompass a wide variety of different materials and can be inorganic or organic. Examples of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene, and polyvinyl chloride. Examples of halide salts include sodium aluminum fluoride, sodium chloride, potassium cryolite, sodium cryolite, ammonium cryolite, potassium tetrafluoroborate (e.g., $KBF_4$), sodium tetrafluoroborate, silicon fluorides, potassium chloride, and magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this disclosure to use a combination of different grinding aids and, in some instances, this may produce a synergistic effect. The above-mentioned examples of grinding aids is meant to be a representative showing of grinding aids, and it is not meant to encompass all grinding aids. Additional examples of grinding aids include sodium metaphosphate, tripotassium phosphate and blends of polyvinyl chloride and potassium tetrafluoroborate.

One component of supersize coats can be a metal salt of a long-chain fatty acid (e.g., a $C_{12}$-$C_{22}$ fatty acid, a $C_{14}$-$C_{18}$ fatty acid, and a $C_{16}$-$C_{20}$ fatty acid). In some examples, the metal salt of a long-chain fatty acid is a stearate salt (e.g., a salt of stearic acid). The conjugate base of stearic acid is $C_{17}H_{35}COO-$, also known as the stearate anion. Useful stearates include, but are not limited to, calcium stearate, zinc stearate, and combinations thereof.

The metal salt of a long-chain fatty acid can be present in an amount of at least 10 percent, at least 50 percent, at least 70 percent, at least 80 percent, or at least 90 percent by weight based on the normalized weight of the supersize coat (i.e., the average weight for a unit surface area of the abrasive article). The metal salt of a long-chain fatty acid can be present in an amount of up to 100 percent, up to 99 percent, up to 98 percent, up to 97 percent, up to 95 percent, up to 90 percent, up to 80 percent, or up to 60 percent by weight (e.g., from about 10 wt. % to about 100 wt. %; about 30 wt. % to about 70 wt. %; about 50 wt. % to about 90 wt. %; or about 50 wt. % to about 100 wt. %) based on the normalized weight of the supersize coat.

Another component of the supersize composition is a polymeric binder, which, in some examples, enables the composition used to form the supersize coat to form a smooth and continuous film over the abrasive layer. In one example, the polymeric binder is a styrene-acrylic polymer binder. In some examples, the styrene-acrylic polymer binder is the ammonium salt of a modified styrene-acrylic polymer, such as, but not limited to, JONCRYL® LMV 7051. The ammonium salt of a styrene-acrylic polymer can have, for example, a weight average molecular weight (Mw) of at least 100,000 g/mol, at least 150,000 g/mol, at least 200,000 g/mol, or at least 250,000 g/mol (e.g., from about 100,000 g/mol to about 2.5×106 g/mol; about 100,000 g/mol to about 500,000 g/mol; or about 250,000 to about 2.5×106 g/mol).

The minimum film-forming temperature, also referred to as MFFT, is the lowest temperature at which a polymer self-coalesces in a semi-dry state to form a continuous polymer film. In the context of the present disclosure, this polymer film can then function as a binder for the remaining solids present in the supersize coat. In some examples, the styrene-acrylic polymer binder (e.g., the ammonium salt of a styrene-acrylic polymer) has an MFFT that is up to 90° C., up to 80° C., up to 70° C., up to 65° C., or up to 60° C.

In some examples, the binder is dried at relatively low temperatures (e.g., at 70° C. or less). The drying temperatures are, in some examples, below the melting temperature of the metal salt of a long-chain fatty acid component of the supersize coat. Use of excessively high temperatures (e.g., temperatures above 80° C.) to dry the supersize coat is undesirable because it can induce brittleness and cracking in the backing, complicate web handling, and increase manufacturing costs. By virtue of its low MFFT, a binder comprised of, e.g., the ammonium salt of a styrene-acrylic polymer allows the supersize coat to achieve better film formation at lower binder levels and at lower temperatures without need for added surfactants such as DOWANOL® DPnP.

The polymeric binder can be present in an amount of at least 0.1 percent, at least 1 percent, or at least 3 percent by weight, based on the normalized weight of the supersize coat. The polymeric binder can be present in an amount of up to 30 percent, up to 12 percent, up to 10 percent, or up to 8 percent by weight, based on the normalized weight of the supersize coat. Advantageously, when the ammonium salt of a modified styrene acrylic copolymer is used as a binder, the haziness normally associated with a stearate coating is substantially reduced. One can also use the epoxy resins described herein as a binder.

The supersize coats of the present disclosure optionally contain clay particles dispersed in the supersize coat. The clay particles, when present, can be uniformly mixed with the metal salt of a long chain fatty acid, polymeric binder, and other components of the supersize composition. The clay can bestow unique advantageous properties to the abrasive article, such as improved optical clarity and improved cut performance. The inclusion of clay particles can also enable cut performance to be sustained for longer periods of time relative to supersize coats in which the clay additive is absent.

The clay particles, when present, can be present in an amount of at least 0.01 percent, at least 0.05 percent, at least 0.1 percent, at least 0.15 percent, or at least 0.2 percent by weight based on the normalized weight of the supersize coat. Further, the clay particles can be present in an amount of up to 99 percent, up to 50 percent, up to 25 percent, up to 10 percent, or up to 5 percent by weight based on the normalized weight of the supersize coat.

The clay particles may include particles of any known clay material. Such clay materials include those in the geological classes of the smectites, kaolins, illites, chlorites, serpentines, attapulgites, palygorskites, vermiculites, glauconites, sepiolites, and mixed layer clays. Smectites in particular include montmorillonite (e.g., a sodium montmorillonite or calcium montmorillonite), bentonite, pyrophyllite, hectorite, saponite, sauconite, nontronite, talc, beidellite, and volchonskoite. Specific kaolins include kaolinite, dickite, nacrite, antigorite, anauxite, halloysite, indellite and chrysotile. Illites include bravaisite, muscovite, paragonite, phlogopite and biotite. Chlorites can include, for example, corrensite, penninite, donbassite, sudoite, pennine and clinochlore. Mixed layer clays can include allevardite and vermiculitebiotite. Variants and isomorphic substitutions of these layered clays may also be used.

As an optional additive, abrasive performance may be further enhanced by nanoparticles (i.e., nanoscale particles) interdispersed (e.g., in the clay particles) in the supersize coat. Useful nanoparticles include, for example, nanoparticles of metal oxides, such as zirconia, titania, silica, ceria, alumina, iron oxide, vanadia, zinc oxide, antimony oxide, tin oxide, and alumina-silica. The nanoparticles can have a median particle size of at least 1 nanometer, at least 1.5 nanometers, or at least 2 nanometers. The median particle size can be up to 200 nanometers, up to 150 nanometers, up to 100 nanometers, up to 50 nanometers, or up to 30 nanometers.

Other optional components of the supersize composition include curing agents, surfactants, antifoaming agents, biocides, and other particulate additives known in the art for use in supersize compositions.

The supersize coat can be formed, in some examples, by providing a supersize composition in which the components are dissolved or otherwise dispersed in a common solvent. In some examples, the solvent is water. After being suitably mixed, the supersize dispersion can be coated onto the underlying layers of the abrasive article and dried to provide the finished supersize coat. If a curing agent is present, the supersize composition can be cured (e.g., hardened) either thermally or by exposure to actinic radiation at suitable wavelengths to activate the curing agent.

The coating of the supersize composition onto, e.g., the abrasive layer can be carried out using any known process. In some examples, the supersize composition is applied by spray coating at a constant pressure to achieve a predetermined coating weight. Alternatively, a knife coating method where the coating thickness is controlled by the gap height of the knife coater can be used.

The term "alkyl" as used herein refers to straight chain and branched alkyl groups having from 1 to 40 carbon atoms ($C_1$-$C_{40}$), 1 to about 20 carbon atoms ($C_1$-$C_{20}$), 1 to 12 carbons ($C_1$-$C_{12}$), 1 to 8 carbon atoms ($C_1$-$C_8$), or, in some embodiments, from 3 to 6 carbon atoms ($C_3$-$C_6$). Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups.

The term "alkoxy" as used herein refers to the group —O-alkyl, wherein "alkyl" is defined herein.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons ($C_6$-$C_{14}$) or from 6 to 10 carbon atoms ($C_6$-$C_{10}$) in the ring portions of the groups.

The term "about" as used herein can allow for a degree of variability in a value or range, for example, within 10%, within 5%, or within 1% of a stated value or of a stated limit of a range.

Unless specified otherwise herein, the term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Unless specified otherwise herein, the term "substantially no" as used herein refers to a minority of, or mostly no, as in less than about 10%, 5%, 2%, 1%, 0.5%, 0.01%, 0.001%, or less than about 0.0001% or less.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

EXAMPLES

The examples described herein are intended solely to be illustrative, rather than predictive, and variations in the manufacturing and testing procedures can yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

The following abbreviations are used to describe the examples:

° C.: degrees Centigrade
cm: centimeter
g/m$^2$: grams per square meter
fpm: feet per minute
J/cm$^2$: Joules per square centimeter
Kg: kilogram
kPa: kiloPascal
min: minute
mm: millimeter
μm: micrometer
mpm: meters per minute
N: Newton
pbw: parts by weight
rpm: revolutions per minute
wt. %: weight percent
W/cm$^2$: Watts per square centimeter Unless stated otherwise, all reagents were obtained or are available from chemical vendors such as Sigma-Aldrich Company, St. Louis, MO, or may be synthesized by known methods. Unless otherwise reported, all ratios are by dry weight.

Abbreviations for materials and reagents used in the examples are as follows:

ARCOL: A polyether polyol, obtained under the trade designation "ARCOL LHT 240" from Bayer Material Science, LLC, Pittsburgh, PA
BA: Butyl acrylate obtained from BASF Corp., Florham Park, NJ
BACK1: A polyester backing prepared as described in Example 12, U.S. Pat. No. 6,843,815 (Thurber et al.).
CPI-6976: A triarylsulfonium hexafluoroantimonate/propylene carbonate photoinitiator, obtained under the trade designation "CYRACURE CPI 6976" from Dow Chemical Company, Midland, MI
E-1001F: A diglycidylether of bisphenol-A epoxy resin, obtained under the trade designation "EPON 1001F" from Momentive Specialty Chemicals, Inc., Columbus, OH.
E-1510: A diglycidylether of hydrogenated bisphenol-A epoxy resin, obtained under the trade designation "EPONEX 1510" from Momentive Specialty Chemicals, Inc.
E-3522 A diglycidylether of bisphenol-A epoxy resin dispersion, obtained under the trade designation "EPI-REZ Resin 3522-W-60" from Momentive Specialty Chemicals, Inc.
EMI: 2-Ethyl-4-methyl imidazole, obtained under the trade designation "EMI-2,4" from Air Products, Allentown, PA
FIL1: Calcium silicate, obtained under trade designation "M400 WOLLASTACOAT" from NYCO Minerals, Inc., Willsboro, NY
FIL2: Cryolite, obtained under the trade designation "CRYOLITE RTN-C" from Freebee A/S, Ullerslev, Denmark.
FIL3: Potassium tetrafluoroborate, obtained under the trade designation, "Potassium Fluorobrate Spec 101" from Atotech USA, Inc., Rockhill, SC
GMA: Glycidyl methacrylate obtained from Dow Chemical Company, Midland, MI
GPTMS: 3-(Glycidoxypropyl) trimethoxysilane, obtained from United Chemical Technologies, Inc., Bristol, PA
HCARB: A calcium carbonate filler, obtained under the trade designation "HUBERCARB Q325" from Huber Engineered Materials, Quincy, IL
HLXY-48: An epoxy resin, obtained under the trade designation "HELOXY 48" from Hexion Specialty Chemicals, Houston, TX
I-651: Benzyldimethyl ketal photoinitiator, obtained under the trade designation "IRGACURE 651" from BASF Corp.
IOTG: Isooctyl thioglycolate obtained from Evans Chemetics, LP, Teaneck, NJ
LVPREN: Ethylene-vinyl acetate copolymer, obtained under the trade designation "LEVAPREN 700HV" from Lanxess Corporation, Pittsburgh, PA
PF1: A phenol-formaldehyde resin having a phenol to formaldehyde weight ratio of 1.5-2.1/1, and catalyzed with 2.5 percent potassium hydroxide.
PKHA: Phenoxy resin, obtained under the trade designation "PHENOXY PKHA" from InChem Corporation, Rock Hill, SC
SAP-1: Shaped abrasive particles were prepared according to the disclosure of U.S. Pat. No. 8,142,531 (Adefris et al.). The fired shaped abrasive particles were about 1.437 mm (side length)×0.27 mm thick.
SAP-2: Shaped abrasive particles, prepared according to the disclosure of U.S. Pat. No. 8,142,531 (Adefris et al.). The shaped abrasive particles were prepared by molding alumina sol gel in equilateral triangle-shaped polypropylene mold cavities. After drying and firing, the resulting shaped abrasive particles were approximately 0.52 mm (side length) by 0.15 mm thick.
RIO: Red iron oxide pigment, obtained under the trade designation "KROMA RO-3097" from Elementis Specialties, Inc., East Saint Louis, IL
SR-351: Trimethylol propane triacrylate, available under the trade designation "SR351" from Sartomer USA, LLC, Exton, PA
SU-8: A polymeric solid epoxy novolac resin, obtained under the trade designation "EPON Resin SU-8" from Momentive Specialty Chemicals, Inc., Columbus, OH.
THFA: Tetrahydrofurfuryl acrylate, V-150, obtained from San Esters Corporation, New York, NY
UVI-6976: 50 wt. % triarylsulfonium hexafluoroantimonate in propylene carbonate, obtained under the trade designation "UVI-6976" from Aceto Pharma Corporation, Port Washington, NY Acrylate copolymers were prepared by the method of U.S. Pat. No. 5,804,610 (Hamer et al.). Solutions were prepared by combining acrylate monomers, radical photoinitiator (e.g., I-651), and chain-transfer agent (e.g., IOTG) in an amber glass jar and swirling by hand to mix. The solution was divided into 25 gram aliquots within heat sealed compartments of an ethylene vinyl acetate-based film, immersed in a 16° C. water bath, and polymerized using UV light (UVA=4.7 mW/cm$^2$, 8 minutes per side).

Make Coat Composition

A make coat resin was prepared by mixing 22.3 parts by weight (pbw) HLXY-48, 6.2 pbw SR-351 and 1.2 pbw I-651 with heating to 60° C. until the photoinitiator was dissolved. 51 pbw PF1, 73 pbw HCARB, and 8 pbw water were added with mixing.

Size Coat Composition

A size coat was prepared by charging a 3 liter plastic container with 431.5 grams PF1, 227.5 gram FILL 227.5 grams FIL2 and 17 grams RIO, mechanically mixing at 21° C. and 15 minutes, then diluting to a total weight of 1 kilogram with water.

Supersize Coat Composition

A supersize coat was prepared by mechanically mixing 29.2 grams E-3522, 3.5 grams EMI, 53.3 grams FIL 3, 14.1 grams water and 2.3 grams RIO at room temperature for 15 minutes.

Example 1

An acrylate copolymer was prepared with 49 pbw BA, 49 pbw THFA, 2 pbw GMA, 0.2 pbw I-651 and 0.1 pbw IOTG.

To prepare a polymerizable epoxy-acrylate resin composition, 32 pbw of the acrylate copolymer was transferred to a model "ATR PLAST-CORDER" mixer, from Brabender GmbH & Co. KG, Duisberg, Germany, and mixed at approximately 120° C. and 100 rpm for several minutes. To the mixer was added 19 pbw E-1001F, 10 pbw LVPREN and 10 pbw PKHA, and the mixing continued for several minutes until homogeneous. 19 pbw E-1510, 10 pbw ARCOL and 1 pbw GPTMS were slowly added and mixing continued for several minutes until homogeneous. To this, 0.5 pbw UVI-6976 was slowly added, dropwise, and stirring continued for several minutes at 120° C. The mixture was then transferred to a silicone release liner and cooled to 21° C. Care was taken to minimize ambient light exposure of the finished sample. Samples of this material were positioned between two silicone coated release films and pressed into approximately 0.6 mm thick resin films by means of a hydraulic press, model "2699" from Carver, Inc., Wabash, IN, set at 95° C.

The liner from one side of a 2 by 3 inch (5.08 by 7.62 cm) section of the resin film was removed and the exposed film face manually laminated to a section of BACK 1 by means of a roller. The remaining release liner was removed and cure of the resin film activated by passing two times through a UV processor, model "FUSION LIGHT HAMMER 10", equipped with a "H" bulb, from Heraeus Noblelight America, Gaithersburg, MD, at 32 fpm (9.75 mpm) This corresponded to a total exposure J/cm$^2$ (W/cm$^2$) of 1.0 UVA, 1.0 UVB, 0.25 UVC and 1.1 UVV as measured by a model "POWER PUCK II" radiometer from EIT, Inc., Sterling, VA Immediately after UV-activation, the above construct was placed on top of a 9.5 by 12 cm section of production tool as described in Example 1 of WO 2015100018 that was filled with SAP1. The tool and construct were pressed together under hand pressure, then the tool was removed to leave a mineral weight addition of about 460 g/m$^2$. The abrasive coated assembly was then held at 21° C. for 24 hours.

Example 2

The procedure generally described for preparing Example 1 was repeated according to the following conditions. The acrylate copolymer was prepared with 50 pbw BA, 50 pbw THFA, 0.2 pbw I-651 and 0.1 pbw IOTG. To prepare the polymerizable epoxy-acrylate resin composition, 32 pbw acrylate copolymer, 19 pbw E-1001F, 10 pbw LVPREN, 10 pbw PKHA, 19 pbw E-1510, 10 pbw ARCOL, 1 pbw GPTMS, and 0.5 pbw UVI-6976 were compounded using a 30 mm Werner & Pfleiderer co-rotating twin screw extruder. Components were pre-mixed, then volumetrically fed into the extruder feed throat and subjected to 300 rotations per minute (rpm) mixing. The extruder, melt transport and die temperatures were set to 110° C. After compounding, the material was coated onto BACK1 at a thickness of 0.003 inch (0.076 mm) and covered with a release liner. Care was taken to minimize ambient light exposure of the finished sample.

The release liner was removed from the resin film/BACK1 laminate. A by 9.5 by 25 cm section of the production tool as described in Example 1 of WO 2015100018 was filled with SAP2, and the tool then pressed onto the exposed resin film. The tool was carefully removed to produce a mineral coating weight of approximately 250 g/m$^2$. This mineral coating process was repeated to produce a 112 cm abrasive belt. The sample was irradiated by passing through a model "UV PROCESSOR", obtained from Fusion UV Systems, Gaithersburg, MD, using a "Fusion D" bulb at 761 Watts/inch$^2$ (118 W/cm$^2$) at 15 fpm (4.6 mpm). The size coat was applied at a coverage rate of 176 g/m$^2$ with a 75 cm paint roller, then cured at 90° C. for 60 minutes and at 102° C. for 60 minutes. The supersize coat was then applied over the size coat in a similar process at a coverage of 160 g/m$^2$ and cured for 30 minutes at 90° C., 8 hours at 102° C. and 60 minutes at 109° C.

Example 3

An abrasive belt was prepared as generally described in Example 2, wherein the polymerizable epoxy-acrylate resin composition was as follows: 32 pbw acrylate copolymer, 10 pbw LVPREN, 10 pbw PKHA, 19 pbw E-1001F, 9 pbw E-1510, 10 pbw SU-8, 10 pbw ARCOL and 1 pbw GPTMS, and 0.5 pbw UVI-6976.

Example 4

An abrasive belt was prepared as generally described in Example 3, wherein the polymerizable epoxy-acrylate resin composition was as follows: 32 pbw acrylate copolymer, 10 pbw LVPREN, 10 pbw PKHA, 19 pbw E-1001F, 19 pbw SU-8, 10 pbw ARCOL and 1 pbw GPTMS, and 0.5 pbw UVI-6976.

Comparative Example A

The make coat composition was applied to BACK1 at a 75 μm wet thickness and 20° C. using a 10 cm wide coating knife (described above) having a blade gap of 75 μm. The make weight coverage was 168 grams per square meter. The sample was irradiated by passing through a model "UV PROCESSOR", obtained from Fusion UV Systems, Gaithersburg, MD, using a "Fusion D" bulb at 761 Watts/inch$^2$ (118 W/cm$^2$) at 15 fpm (4.6 mpm). A by 9.5 by 25 cm section of the production tool as described in Example 1 of WO 2015100018 was filled with SAP2, then placed onto make coating and then removed to leave a mineral weight addition of about 250 g/m$^2$. This mineral coating process was repeated to produce a 112 cm abrasive belt. The abrasive belt was then cured at 90° C. for 90 minutes and at 102° C. for 60 minutes. After cooling, the size coat was applied at a coverage rate of 176 g/m$^2$ with a 75 cm paint roller, then cured at 90° C. for 60 minutes and at 102° C. for 60 minutes. The supersize coat was then applied over the size coat in a similar process at a coverage of 160 g/m$^2$ and cured for 30 minutes at 90° C., 8 hours at 102° C. and 60 minutes at 109° C.

Comparative Example B

A commercially available abrasive belt, obtained under the trade designation "984F 80+ CUBITRON II METALWORKING BELT", obtained from 3M Company, St. Paul, MN

Comparative Example C

An abrasive belt was prepared as generally described in Example 2, wherein the polymerizable epoxy-acrylate resin composition was as follows: 8 pbw acrylate copolymer, 10 pbw LVPREN, 10 pbw PKHA, 19 pbw E-1001F, 44 pbw SU-8, 10 pbw ARCOL, and 0.5 pbw UVI-6976.
Grinding Test The grinding tests were conducted on 1.9 by 1.9 cm 304 stainless steel workpiece, using 9.5 by 91.4 cm belt samples run at 2,750 rpm and 2.3 Kg force, over a 20.3 cm diameter 50 Durometer rubber, smooth contact wheel. The weight loss of the workpiece was measured after 30 cycles of 15 seconds/cycle grinding, wherein the workpiece was cooled between each cycle. The total amount of metal removed was recorded as total cut. Results are listed in Table 1.

Probe Tack Measurements

The compositions from Examples 2, 4 and Comparative Example C were knife coated between two release coated polyester films at 110° C. to a thickness of 0.17±0.02 mm. Samples of each were cut to approximately 25.4 mm by 125 mm. The samples were transferred to stainless steel coupons for tack measurements. Measurements of tack before cure were conducted using a TA.XTplus texture analyzer (Stable Micro Systems, Godalming, Surrey, UK) equipped with a spherical stainless steel probe 1 cm in diameter, a linear motorized sample stage and two high-speed cameras. The probe was brought into contact with the samples at a rate of 0.1 mm/sec to a depth sufficient to produce 0.14 N of force. The probe was held at constant 0.14 N force for 5 seconds, then retracted from the sample at a rate of 5 mm/sec over a distance of 2 mm. Force and distance were recorded as a function of time. The measurement was repeated 5 times using a new region of the sample for each iteration. Contact diameter between the probe and film was measured optically using the high-speed video obtained during testing and the average for three measurements was used to calculate the contact area for each sample. The average peak force divided by the average contact area is taken to be the tack for each sample. The values are tabulated in Table 2.

Aligned Mineral Retention

A resin film was applied to BACK1. A 1 by 1 inch (2.54 by 2.54 cm) section of the production tool as described in Example 1 of WO 2015100018 was filled with SAP1 and the tool then pressed onto the exposed resin film. The tool was then carefully removed to produce a mineral coating weight of approximately 250 g/m$^2$ and the abrasive mineral coated BACK1 inverted. The percent of abrasive mineral remaining adhered to BACK1 after inversion was then measured.

Probe Tack and Mineral Retention data are reported in Table 2.

TABLE 1

| Sample | Total Cut (grams) | % Cut Versus Comparative Example B |
|---|---|---|
| Example 2 | 278 | 134 |
| Comparative Example A | 267 | 129 |
| Comparative Example B | 207 | 100 |

TABLE 2

| Sample | Probe Tack Peak Force (kPa) | Aligned mineral retention after coating (%) |
|---|---|---|
| Example 2 | 300 ± 27.6 | >95 |
| Example 3 | Not tested | >95 |
| Example 4 | 340.1 ± 31.6 | >95 |
| Comparative Example C | 241.7 ± 131.5 | <20 |

It will be apparent to those skilled in the art that the specific structures, features, details, configurations, etc., that are disclosed herein are simply examples that can be modified and/or combined in numerous embodiments. All such variations and combinations are contemplated by the inventor as being within the bounds of this disclosure. Thus, the scope of the disclosure should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control. Furthermore, all publications, patents, and patent documents referred to in this document are incorporated by reference herein in their entirety, as though they were fully set forth herein.

What is claimed is:

1. A curable composition comprising:
a polymerizable epoxy-acrylate resin composition comprising from about 15 to about 50 parts by weight of an acrylate copolymer relative to 100 parts of the curable composition and having a complex viscosity at 25° C. and 1 Hz frequency of at least about 4500 Pa-s and a probe tack peak force of at least about 300 kPa; and
abrasive particles partially or fully embedded in the polymerizable epoxy-acrylate resin component.

2. The curable composition of claim 1, wherein the polymerizable epoxy-acrylate resin composition has an aligned mineral retention after coating of at least about 95%.

3. The curable composition as in claim 1, wherein the acrylate copolymer comprises a tetrahydrofurfuryl (THF) (meth)acrylate copolymer component, and the polymerizable epoxy-acrylate resin composition further comprises one or more epoxy resins and one or more hydroxy-functional polyethers.

4. The curable composition as in claim 1, wherein the polymerizable epoxy-acrylate resin composition further comprises one or more hydroxyl-containing film-forming polymers.

5. The curable composition as in claim 1, further comprising one or more photoinitiators.

6. The curable composition as in claim 3, wherein the THF (meth)acrylate copolymer component comprises one or more THF (meth)acrylate monomers, one or more $C_1$-$C_8$ (meth)acrylate ester monomers, and one or more optional cationically reactive functional (meth)acrylate monomers.

7. The curable composition as in claim 3, wherein the THF (meth)acrylate copolymer component comprises polymerized monomer units of: (A) 40-60 wt % of tetrahydrofurfuryl (meth)acrylate; (B) 40-60 wt % of $C_1$-$C_8$ alkyl (meth)acrylate ester monomers; and (C) 0-10 wt % of cationically reactive functional monomers, wherein the sum of A)-C) is 100 wt % of the THFA copolymer.

8. The curable composition as in claim 3, wherein the curable composition comprises: i) the acrylate copolymer; ii) from about 25 to about 50 parts by weight of the one or more epoxy resins; iii) from about 5 to about 15 parts by weight of the one or more hydroxy-functional polyethers; iv) in the range of from about 10 to about 25 parts by weight of one or more hydroxyl-containing film-forming polymers; where the sum of i) to iv) is 100 parts by weight; and v) from about 0.1 to about 5 parts by weight of a photoinitiator, relative to the 100 parts of i) to iv).

9. The curable composition as in claim 3, wherein the one or more hydroxy-functional polyethers is a liquid.

10. The curable composition as in claim 5, wherein the photoinitiator is a cationic photoinitiator.

11. The curable composition as in claim 1, wherein the abrasive particles comprise formed abrasive particles.

12. A cured composition formed from the curable composition of claim 1, wherein the abrasive particles are partially or fully embedded in the cured composition.

13. An abrasive article comprising the cured composition of claim 12 as an abrasive layer.

14. The abrasive article of claim 13, further comprising at least one of a size coat, a supersize coat, and a backing.

15. The abrasive article of claim 13, further comprising a size coat having a size coat first major surface and a size coat second major surface and the abrasive layer has an abrasive layer first major surface and an abrasive layer second major surface, wherein the abrasive layer first major surface is in direct contact with the size coat second major surface.

16. The abrasive article of claim 15, wherein substantially the entire abrasive layer first major surface is in direct contact with substantially the entire size coat second major surface.

17. The abrasive article of claim 13, further comprising a backing having a backing first major surface and a backing second major surface, wherein the backing first major surface is in direct contact with the abrasive layer second major surface.

18. The abrasive article of claim 17, wherein substantially the entire backing first major surface is in direct contact with substantially the entire abrasive layer second major surface.

19. The abrasive article of claim 13, further comprising a supersize coat having a supersize coat first major surface and a supersize coat second major surface, wherein the supersize coat second major surface is in direct contact with the size coat first major surface.

20. The abrasive article of claim 19, wherein substantially the entire supersize coat second major surface is in direct contact with substantially the entire size coat first major surface.

21. The abrasive article of claim 13, further comprising a backing having a backing first major surface and a backing second major surface, wherein the backing first major surface is in direct contact with the abrasive layer second major surface.

22. The abrasive article of claim 21, wherein substantially the entire backing first major surface is in direct contact with substantially the entire abrasive layer second major surface.

\* \* \* \* \*